United States Patent
Moriguchi et al.

(10) Patent No.: US 6,680,903 B1
(45) Date of Patent: Jan. 20, 2004

(54) NETWORK SYSTEM, NETWORK TERMINAL, AND METHOD FOR SPECIFYING LOCATION OF FAILURE IN NETWORK SYSTEM

(75) Inventors: Kenichi Moriguchi, Neyagawa (JP); Toshihisa Ikeda, Kyoto (JP); Yuji Mizuguchi, Kyoto (JP); Takahisa Sakai, Amagasaki (JP); Toshikazu Hattori, Kyoto (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/348,253

(22) Filed: Jul. 7, 1999

(30) Foreign Application Priority Data

Jul. 10, 1998 (JP) .............................. 10-195394
Jun. 11, 1999 (JP) .............................. 11-165720

(51) Int. Cl.$^7$ .................................. H04J 1/16
(52) U.S. Cl. ...................................... 370/216; 370/217
(58) Field of Search ............................. 370/216, 217, 370/218, 219, 220, 221, 222, 223, 224, 225, 226, 227, 228, 401, 403, 404, 405, 406, 407, 408, 449, 321, 345, 252, 241, 254; 340/913, 914, 825.52, 3.51, 827; 701/1, 36, 29, 33; 374/221

(56) References Cited

U.S. PATENT DOCUMENTS 5,434,861 A  * 7/1995 Pritty et al. ................. 370/449
6,587,756 B2 * 7/2003 Moriguchi et al. ............ 701/1
6,600,975 B2 * 7/2003 Moriguchi et al. ............ 701/1

FOREIGN PATENT DOCUMENTS

| JP | 5-225161 | 9/1993 |
| JP | 6-21955 | 1/1994 |
| JP | 2667256 | 6/1997 |
| JP | 10-333930 | 12/1998 |

* cited by examiner

Primary Examiner—Dang Ton
(74) Attorney, Agent, or Firm—Parkhurst & Wendel, L.L.P.

(57) ABSTRACT

In a network of a topology of a loop and a bus, occurrence of a failure is detected and a location of the failure is specified. Occurrence of the failure is detected by detecting that a specific signal pattern to be received at regular time intervals within a fixed time period is not received. A node which has detected occurrence of the failure transmits or receives a specifying signal among the nodes, and decide whether or not the failure has occurred adjacently to itself. A packet indicating a decided location of the failure is transmitted or received among nodes, and thereby respective nodes specify the location of the failure. When the failure has occurred at the master node, a node having a smallest node ID after waiting time according to the node ID operates as the alternative master node.

29 Claims, 13 Drawing Sheets

NETWORK SYSTEM, NETWORK TERMINAL, AND METHOD FOR SPECIFYING LOCATION OF FAILURE IN NETWORK SYSTEM

FIELD OF THE INVENTION

The present invention relates to a method for automatically selecting an alternative master node from slave nodes when a failure occurs at a master node and a method for specifying a location of a failure such as line disconnection or a node failure and recovering from the failure, in a network system in which the master node and at least one slave node are present, and the master node transmits a specific signal pattern, which is received by every node at regular time intervals within a fixed time period, and a network system in which specifying the location of the failure and recovering from the failure are implemented.

BACKGROUND OF THE INVENTION

In a conventional network system in which a master node and slave nodes are present, and the master node which arbitrates a data transmission right is required for data transmission, when a failure occurs at the master node, data communication becomes impossible.

Meanwhile, in a method for detecting a location of a failure in the conventional network system, for example, as disclosed in Japanese Published Patent Application No. Syo 56-161742, in a loop-type network, when a no-carrier state continues during more than a fixed time period, each node which has detected the no-carrier state outputs its carrier, and after specified time elapses, a slave node outputs a response including its node address by means of its carrier, whereby the master node recognizes that there exists a failure before the slave node which output this address.

Hereinafter, this method (Japanese Published Patent Application No. Syo 56-161742) will be described with reference to FIG. 12. FIG. 12 shows an example of the loop-type network. In FIG. 12, reference numeral 12a denotes a main station, 12b, 12c, 12d, and 12e denote terminal stations, and 12f denotes a line. In a normal state, the main station 12a sends a carrier to the terminal station 12b. With this carrier, data is transmitted. The terminal stations 12b–12ereceive, reproduce, and relay this carrier. In the normal state, the nodes 12b, 12c, 12d, and 12e and the main station 12a receive and detect the carrier.

As shown in FIG. 12, when a failure occurs on a line between the terminal stations 12b and 12c, the terminal stations 12c, 12d, and 12e, and the main station 12a detect the no-carrier state, although the terminal station 12b does not detect the no-carrier state, because it receives the carrier normally.

Upon detecting the no-carrier state, each station outputs its carrier after Ta time has elapsed. Therefore, the terminal stations 12d, 12e, and the main station 12a can detect the carrier again. The station which has detected the carrier stops sending its carrier. However, since the failure has occurred on the line between the terminal stations 12b and 12c, the terminal 12c continues detecting the no-carrier state.

Hence, the terminal station 12c prepares for outputting a line down response after Tb time period after outputting its carrier. After Tc time period, the terminal station 12c repeats outputting the line down response including its address at time intervals of Td by means of its carrier. The main terminal 12a receives the line down response from the terminal 12c, thereby detecting there is line disconnection between the terminal station 12c and the terminal station 12b.

In this method, however, when a network is not of a loop type, the location of the failure cannot be specified if occurrence of the failure is detected by detecting the no-carrier state, depending upon construction of the network.

Turning now to FIG. 13, there is shown a network system disclosed in Japanese Published Patent Application No. Hei. 10-113459, in which at least one loop comprising plural loop-connected nodes and at least one loop comprising either a single node or plural loop-connected nodes are directly connected to a common transmission line. Using this network system, two cases, that is, a case where a line disconnection failure occurs between nodes 112 and 111, and a case where a node failure occurs at a master node 101, will be discussed below.

When the line disconnection failure has occurred between the nodes 112 and 111, the nodes 111 and 110 respectively detect the no-carrier state and thereby detect that the failure has occurred. If each of the nodes 111 and 110 which have detected the failure, outputs its carrier, the carrier output from the master node 101 and the carrier output from the node 110 collides on the common communication line 15, and thereby the carrier (from the nodes 111 and 110) is not received normally. As a consequence, the location of the failure cannot be detected/specified.

When the node failure has occurred at the master node 101 and thereby the master nodes 101 stops outputting the carrier, nodes other than the master node 101, i.e., the nodes 100, 110, 111, 112, 120, and 121, detect the no-carier state and thereby detect that the failure has occurred. If the nodes 100, 110, 111, 112, 120, and 121 which have detected occurrence of the failure, each outputs its carrier, the nodes 110, 111, and 120 receive this carrier, whereas the nodes 101, 112, and 121 on upper-most streams in respective loops do not receive this carrier normally, because the carriers output from the nodes 100, 110, and 120 on lower-most streams in the respective loops collide on the common transmission line 15. Thereafter, when the nodes (101, 112, 121) which did not receive this carrier, output responses including their node addresses, these responses also collide on the common transmission line 15, and therefore, the responses cannot be received normally, either. As a consequence, the location of the failure cannot be detected/specified.

In some networks, when a failure occurs at a master node, an alternative master node is selected, whereby stop of operation of the whole network can be avoided. In such networks, it is required that the node which has detected occurrence of the failure decide whether or not the alternative master node should be selected depending upon whether or not the failure has occurred at the master node, respectively. Unless this decision is made, when a failure occurs and the alternative master node need not be selected, a node decides that the alternative master node should be selected even though this is unnecessary, and thereby operates as the alternative master node, which adversely affects operation of the network. On the other hand, when a failure occurs and the alternative master node should be selected, if it is decided that the alternative master node need not be selected even though this is necessary, the alternative master node will not be selected.

To make the above decision, it is necessary to specify the location of the failure. In the method disclosed in Japanese Published Patent Application No. Syo. 56-161742, the location of the failure cannot be specified in the network disclosed in the Japanese Published Patent Application No. Hei. 10-113459.

SUMMARY OF THE INVENTION

The present invention is directed to solving the above-described problem, and it is an object of the present invention to provide a network system, a method for specifying a location of a failure, and a method for recovering from the failure, in which occurrence of the failure is detected and the location of the failure is specified, and when a failure occurs at a master node, an alternative master node is automatically selected from slave nodes, whereby stop of operation of the whole network system due to the failure of the master node is avoided, using the network system in which at least one loop comprising plural loop-connected nodes and at least one loop comprising either a single node or plural loop-connected nodes are directly connected to a common transmission line shown in FIG. 13.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, in a network system in which plural nodes are connected by means of a transmission line, and a specific signal pattern is transmitted to the transmission line at regular time intervals within a fixed time period, each of the plural nodes includes signal monitoring means for detecting existence/non-existence of a signal transmitted on the transmission line and detection means for detecting receiving of the specific signal pattern, the detection means detecting occurrence of a failure in the network system, and each of nodes which have detected occurrence of the failure, specifies a location of the failure such that a specifying signal is transmitted/received among the nodes, whether or not the specifying signal is received is detected by the signal monitoring means to decide whether or not the failure has occurred at a spot adjacent to itself, and a signal for specifying a decided location of the failure is transmitted/received among the nodes. Therefore, in the network system in which at least one loop comprising plural loop-connected nodes and at least one loop comprising either a single node or the plural loop-connected nodes are directly connected to a common transmission line, occurrence of the failure can be detected, and the location of the failure can be specified.

According to a second aspect of the present invention, in a network system in which at least one loop comprising plural nodes loop-connected by means of a transmission line and at least one loop comprising either a single node or the plural nodes loop-connected by means of the transmission line are directly connected to a common transmission line having at least one input port and at least one output port in which a signal input through one input port branches and the resulting signals are output from all output ports, a node of the plural nodes included in one of the loops serves as a master node, nodes other than the node serving as the master node serve as slave nodes, nodes present on lower-most streams in respective loops become lower-most stream nodes in the respective loops, and a specific signal pattern is transmitted at regular time intervals within a fixed time period, each node includes signal monitoring means for detecting existence/non-existence of a signal transmitted on the transmission line and outputting a monitor signal, and detection means for detecting receiving of the specific signal pattern and outputting a signal indicating undetection when the specific signal pattern has not been received during more than a fixed time period, and detects occurrence of a failure in the network system according to the signal indicating undetection, each of nodes which have detected occurrence of the failure, notifies an adjacent node of occurrence of the failure by the use of a notification signal, respective nodes in the network system detect occurrence of the failure according to the notification signal, each of the nodes which have detected occurrence of the failure in the respective loops, transmits a specifying signal to an adjacent node, a node which has detected that it does not receive the specifying signal, according to the monitor signal output from the signal monitoring means, decides that the failure has occurred on an upper stream of itself, and transmits information of a location of the failure in the corresponding loop in the form of an identifier packet including information which identifies itself, to the corresponding lower-most stream node, each of plural lower-most stream nodes, decides the location of the failure in the corresponding loop according to the identifier packet and the monitor signal, and transmits information of a decided location of the failure in the corresponding loop in the form of the identification packet such that identifier packets from respective lower-most steam nodes do not collide, and each of the nodes which have detected occurrence of the failure and the nodes which have detected occurrence of the failure according the notification signal, specifies the location of the failure in the network system, according to the monitor signal and the identifier packets. Therefore, in the network system in which at least one loop comprising plural loop-connected nodes and at least one loop comprising either a single node or the plural loop-connected nodes are directly connected to a common transmission line, occurrence of the failure can be detected, and the location of the failure can be specified.

According to a third aspect of the present invention, in the network system of the second aspect, the master node outputs an inquiry packet to each of the lower-most stream nodes at normal operation, each of the lower-stream nodes outputs a response packet upon receiving the inquiry packet directed to itself, and the master node detects occurrence of the failure by detecting that it does not receive the response packet. Therefore, in the network system in which at least one loop comprising plural loop-connected nodes and at least one loop comprising either a single node or the plural loop-connected nodes are directly connected to a common transmission line, it is possible to detect node failure at the lower-most stream node, and occurrence of line disconnection failure just below the lower-most stream node.

According to a fourth aspect of the present invention, in the network system of the first or second aspect, the network includes a master node and at least one slave node, each of the master node and slave nodes has a unique node identifier used for identifying itself, and the slave nodes includes at least one candidate node for an alternative master node, the candidate node which can perform communication normally, when deciding that the alternative master node should be selected according to a specified location of the failure in the network system, starts operation as the alternative master node after waiting time according to the unique node identifier elapses, the candidate node which can perform communication normally, when detecting return of the master node during the waiting time, returns to operation of the slave node, and thereby the alternative master node is selected from at least one candidate node group, and priorities are determined according to unique node identifiers and, after time required for transmitting information indicating that a candidate node of a priority K (K: integer) has started operation as the alternative master node is transmitted to all nodes elapses, waiting times of a candidate node having a priority lower than the K ends. Therefore, in the network system in which at least one loop comprising plural loop-connected nodes and at least one loop comprising either a single node or the plural loop-connected nodes are directly connected to a common transmission line, occurrence of the failure can be detected, and the location of the failure can be specified. Also, when the failure occurs at the master node, the alternative master node is automatically selected from slave nodes, whereby stop of operation of the whole network system due to the failure at the master node can be avoided.

According to a fifth aspect of the present invention, in a method for specifying a location of a failure in a network system in which plural nodes are connected by means of a transmission line, and a specific signal pattern is transmitted to the transmission line at regular time intervals of within a first fixed time period, nodes detect occurrence of the failure in the network system by detecting that they have not received the specific signal pattern during more than a second fixed time period, each of the nodes which have detected occurrence of the failure, transmits/receives a specifying signal among nodes, and decides whether or not the failure has occurred at a spot adjacent to itself by detecting that it does not receive the specifying signal, and respective nodes specify the location of the failure in the network system by transmitting/receiving a signal indicating a decided location of the failure. Therefore, in the network system in which at least one loop comprising plural loop-connected nodes and at least one loop comprising either a single node or the plural loop-connected nodes are directly connected to a common transmission line, occurrence of the failure can be detected, and the location of the failure can be specified.

According to a sixth aspect of the present invention, in a method for specifying a location of a failure in a network system in which at least one loop comprising plural nodes loop-connected by means of a transmission line and at least one loop comprising either a single node or the plural nodes loop-connected by means of the transmission line are directly connected to a common transmission line having at least one input port and at least one output port, in which a signal input through one input port branches and the resulting signals are output from all output ports, a node included in one of loops serves as a master node, nodes other than the node serving as the master node serve as slave nodes, nodes present on lower-most streams in respective loops become lower-most stream nodes in the respective loops, and a specific signal pattern is transmitted at regular time intervals within a first fixed time period, nodes detect occurrence of the failure in the network system by detecting that they have not received the specific signal pattern during more than a second fixed time period, each of the nodes which have detected occurrence of the failure, outputs a notification signal to notify an adjacent node that the failure has occurred, respective nodes in the network system detect occurrence of the failure according to the notification signal, each of the nodes which have detected occurrence of the failure in the respective loops, outputs a specifying signal to an adjacent node, a node decides that the failure has occurred on an upper stream of itself by detecting that it does not receive the specifying signal, and outputs information of the location of the failure in the corresponding loop in the form of an identifier packet including information for identifying itself, to the corresponding lower-most stream node, and plural lower-most stream nodes, each decides the location of the failure in the corresponding loop, from the identifier packet and the monitor signal, and transmits information of a decided location of the failure in the form of an identifier packet such that identifier packets transmitted from the plural lower-most stream nodes do not collide, and the nodes which have detected occurrence of the failure and the nodes which have detected occurrence of the failure according the notification signal, each specifies the location of the failure in the network system, according to the monitor signal and the identifier packets. Therefore, in the network system in which at least one loop comprising plural loop-connected nodes and at least one loop comprising either a single node or the plural loop-connected nodes are directly connected to a common transmission line, occurrence of the failure can be detected, and the location of the failure can be specified.

According to a seventh aspect of the present invention, in a network system in which a network includes a master node having a unique node identifier and either one or a plurality of slave nodes each having a unique node identifier, and the slave nodes includes at least one candidate node for an alternative master node, said network system being a master-slave network system, the candidate node which can perform communication normally, when detecting a failure at the master node, starts operation as the alternative master node after waiting time according to the unique node identifier elapses, the candidate node which can perform communication normally, when detecting return of the master node during the waiting time, returns to operation of the slave node, and thereby the alternative master node is selected from at least one candidate node group, and priorities are determined according to unique node identifiers and, after time required for transmitting information indicating that a candidate node of a priority K (K: integer) has started operation as the alternative master node to all nodes elapses, waiting times of a candidate node having a priority lower than the K ends. Therefore, in the network system in which at least one loop comprising plural loop-connected nodes and at least one loop comprising either a single node or the plural loop-connected nodes are directly connected to a common transmission line, when the failure occurs at the master node, the alternative master node can be selected automatically.

DETAILED DESCRIPTION OF THE PREFERRED EMBODIMENTS

Now, a preferred embodiment of the present invention will be described with reference to FIGS. 1 through 11. Embodiment 1.

Figure 1:
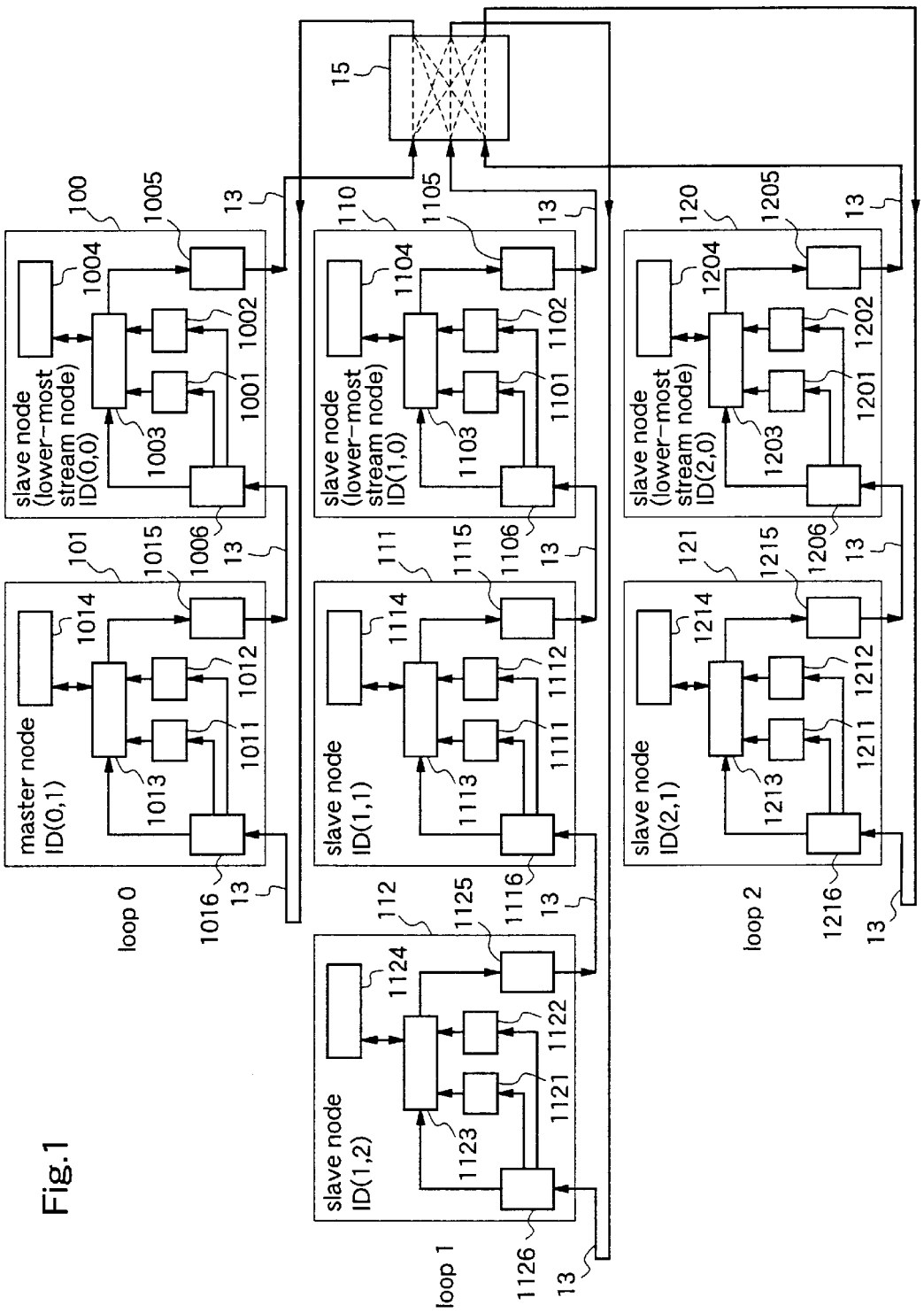
FIG. 1 is a diagram showing construction of a network system according to a first embodiment of the present invention.

FIG. 1 is a diagram showing construction of a network system according to a first embodiment of the present invention. Turning to FIG. 1, in this network, loops 0, 1, and 2 each comprising plural loop-connected nodes are connected to a common transmission line (bus) 15. This network comprises a master node 101, and one or more slave nodes 100, 110, 111, 112, 120, and 121. Reference numeral 13 denotes a transmission line. The common transmission line 15 has one or more input ports and one or more output ports. In this transmission line 15, a signal input through one input port branches therein, and the resulting signals are output from all the output ports. The transmission line 15 is realized by an optical star coupler and the like when a signal to-be-transmitted is an optical signal, and is realized by an electric bus when the signal to-be-transmitted is an electric signal. Herein, assume that the transmission line 15 is realized by the optical star coupler and the transmission line 13 is realized by optical fiber. In FIG. 1, arrows indicate how data flows. The loops each comprising nodes connected in one direction are connected to the optical star coupler 15.

The node 100 is the lower-most stream node in the loop 0 comprising the nodes 100 and 101. The node 110 is the lower-most stream node in the loop 1 comprising the nodes 110, 111, and 112. The node 120 is the lower-most stream node in the loop 2 comprising the nodes 120 and 121. In each of the lower-most stream nodes in the loops, the output of the corresponding transmission means is directly connected to the optical star coupler 15.

In description below, when transmission means of a node A is directly connected to receiving means of a node B by means of the transmission line, the node B is called a "node just below the node A" and the node A is called a "node just above the node B". For example, in the network system shown in FIG. 1, the node 110 is a node just below the node 111, and the node 111 is a node just above the node 110. The transmission line between the nodes 110 and 111 is a transmission line just below the node 111, or a transmission line just above the node 110.

To respective nodes in the network, node IDs (identifiers) for identifying them are assigned. The node ID comprises a loop address of a loop to which the corresponding node belongs and a node address on the loop. The loop address is a number unique to the corresponding loop for identifying it. The node address is a node number unique to the corresponding node, for identifying it on the corresponding loop. To specify a node on the network, it is necessary to specify a loop address of the node and a node address of the node on the corresponding loop. In this embodiment, the node ID is described as (loop address, node address). For example, when the loop address is "1" and the node address is "2", the node ID of the corresponding node is represented as (1, 2). A node ID of the node 100 is (0, 0), a node ID of the node 101 is (0, 1), a node ID of the node 110 is (1, 0), a node ID of the node. 111 is (1, 1), a node ID of the node 112 is (1, 2), a node ID of the node 120 is (2, 0), and a node ID of the node 121 is (2, 1).

In the respective nodes, reference numerals 1001, 1011, 1101, 1111, 1121, 1201, and 1211 denote detection means, 1002, 1012, 1102, 1112, 1122, 1202, and 1212 denote signal monitoring means, 1003, 1013, 1103, 1113, 1123, 1203, and 1213 denotes control means, 1004, 1014, 1104, 1114, 1124, 1204, and 1214 denote storage means, 1005, 1015, 1105, 1115, 1125, 1205, and 1215 denote transmission means, and 1006, 1016, 1106, 1116, 1126, 1206, and 1216 denote receiving means.

Each node comprises detection means, signal monitoring means, control means, storage means, transmission means, and receiving means. Reference numeral 1001 denotes detection means of the node 100, 1002 denotes signal monitoring means of the node 100, 1003 denotes control means of the node 100, 1004 denotes storage means of the node 100, 1005 denotes transmission means of the node 100, and 1006 denotes receiving means of the node 100. Reference numeral 1011 denotes detection means of the node 101, 1012 denotes signal monitoring means of the node 101, 1013 denotes control means of the node 101, 1014 denotes storage means of the node 101, 1015 denotes transmission means of the node 101, and 1016 denotes receiving means of the node 101. Reference numeral 1101 denotes detection means of the node 110, 1102 denotes signal monitoring means of the node 110, 1103 denotes control means of the node 110, 1104 denotes storage means of the node 110, 1105 denotes transmission means of the node 110, and 1106 denotes receiving means of the node 110. Reference numeral 1111 denotes detection means of the node 111, 1112 denotes signal monitoring means of the node 111, 1113 denotes control means of the node 111, 1114 denotes storage means of the node 111, 1115 denotes transmission means of the node 111, and 1116 denotes receiving means of the node 111. Reference numeral 1121 denotes detection means of the node 112, 1122 denotes signal monitoring means of the node 112, 1123 denotes control means of the node 112, 1124 denotes storage means of the node 112, 1125 denotes transmission means of the node 112, and 1126 denotes receiving means of the node 112. Reference numeral 1201 denotes detection means of the node 120, 1202 denotes signal monitoring means of the node 120, 1203 denotes control means of the node 120, 1204 denotes storage means of the node 120, 1205 denotes transmission means of the node 120, and 1206 denotes receiving means of the node 120. Reference numeral 1211 denotes detection means of the node 121, 1212 denotes signal monitoring means of the node 121, 1213 denotes control means of the node 121, 1214 denotes storage means of the node 121, 1215 denotes transmission means of the node 121, and 1216 denotes receiving means of the node 121.

The detection means 1001, 1011, 1101, 1111, 1121, 1201, and 1211 each detects that a specific signal pattern transmitted on the transmission line is received, and outputs a signal indicating "undetection" when the specific signal pattern is not detected during more than a fixed time period.

The signal monitoring means 1002, 1012, 1102, 1112, 1122, 1202, and 1212 each detects the existence/nonexistence of a signal transmitted on the transmission line, and outputs a monitor signal. The signal monitoring means outputs the monitor signal "1" when there is a signal transmitted on the transmission line, and outputs the monitor signal "0" when there is no signal. In this embodiment, the signal monitoring means detects the existence/non-existence of the optical signal on the transmission line.

The control means 1003, 1013, 1103, 1113, 1123, 1203, and 1213 each detects occurrence of the failure and decides the location of the failure, according to the monitor signal output from the corresponding signal monitoring means, the signal indicating "undetection" output from the corresponding detection means, and a received packet.

The storage means 1004, 1014, 1104, 1114, 1124, 1204, and 1214 each stores a node ID for identifying the corresponding node, information indicating that the corresponding node is the master node or the slave node, information indicating whether or not the corresponding node is the lower-most stream node, and a node ID of the master node. In this embodiment, the storage means 1014 stores information indicating that the corresponding node is the master node, and the other storage means each stores information indicating that the corresponding node is the slave node. The storage means 1004, 1104, and 1204 each stores information indicating that the corresponding node is the lower-most stream node, and the other storage means each stores information indicating that the corresponding node is not the lower-most stream node. The storage means of all the nodes stores the node ID (0, 1) of the master node.

The transmission means 1005, 1015, 1105, 1115, 1125, 1205, and 1215 each transmits a notification signal, a specifying signal and a packet toward the transmission line.

The receiving means 1006, 1016, 1106, 1116, 1126, 1206, and 1216 each receives the notification signal, the specifying signal, and the packet on the transmission line.

Hereinafter, a detailed description will be given of a method for specifying the location of the failure when the failure such as the line disconnection or the node failure occurs in the network system so constructed, and a method for selecting an alternative master node as necessary.

First, operation in a normal state will be described. Suppose that the node 101 transmits a signal. The signal transmitted from the transmission means 1015 of the node 101 toward the transmission line passes through the node 100 and reaches the optical star coupler 15. The optical star coupler 15 has one or more input ports and one or more output ports, and the signal input through one input port branches therein and the resulting signals are output from all output ports. Therefore, the signal which reached the optical star coupler 15 branches therein and the resulting signals are transmitted to the nodes 101, 112, and 121. The signal transmitted to the node 101 is discarded there as a transmission source node of the signal. The signal transmitted to the node 112 passes through the node 111, and is then transmitted to the lower-most stream node 110, where it is discarded. The signal transmitted to the node 121 is transmitted to the lower-most stream node 120, where it is discarded. In the normal state, the transmission source node (node 101) of the signal, and the lower-most stream nodes (nodes 110 and 120) in the loops different from the loop to which the transmission source node belongs, discard the signal. The lower-most stream node (node 100) in the loop to which the transmission source node belongs does not discard the signal.

In the normal state, the master node 101 transmits a specific signal pattern at regular time intervals. The specific signal pattern is transmitted from the master node 101 to all the nodes, received by them, and then discarded by the lower-most stream nodes 110 and 120, and the master node 101 as the transmission source node of the pattern, in the same manner as described above. In the normal state, every node receives the specific signal pattern at regular time intervals. The detection means of every node detects receiving of the specific signal pattern transmitted on the transmission line, and therefore does not output the signal indicating "undetection". The signal monitoring means of every node detects the signal transmitted on the transmission line, and therefore outputs "1" as the monitor signal. In this embodiment, there are two types of signal levels, i.e., "High level" (existence of optical signal) and "Low level" (non-existence of optical signal), as signals levels on the transmission line. The signal monitoring means detects the signal level on the transmission line. When the signal level is High, the signal monitoring means outputs "1", while when the signal level is Low, the signal monitoring means outputs "0".

Figure 4:
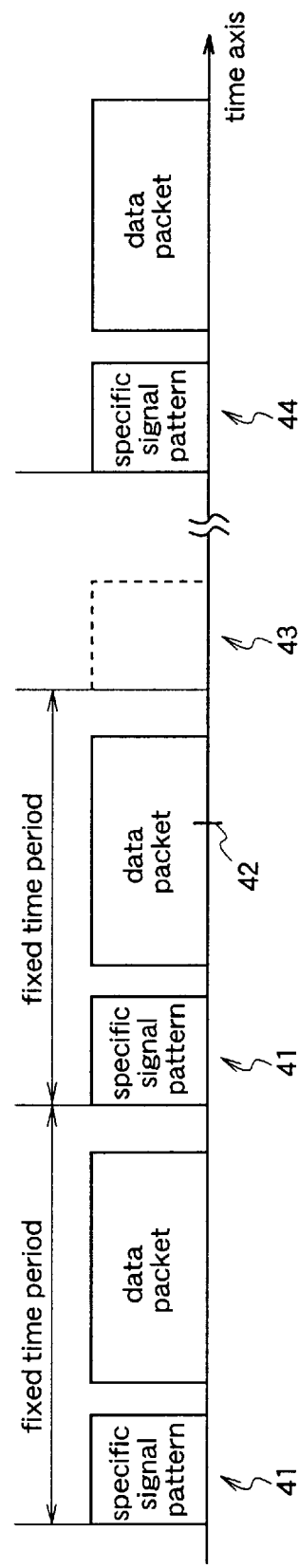
FIG. 4 is a diagram for explaining a method for detecting a failure of the first embodiment.

FIG. 4 explains how the failure in the network is detected. In FIG. 4, reference numeral 41 denotes the specific signal pattern output from the master node, 42 denotes time when the failure has occurred, 43 denotes a specific signal pattern which is not received due to the failure, and 44 denotes a specific signal pattern which is received after recovering from the failure as a result of selection of the alternative master node and the like. As shown in FIG. 4, occurrence of the failure is detected by detecting that the specific signal pattern to-be-transmitted within a fixed time period is lost, and recovering from the failure is detected by receiving the specific signal pattern.

Initially, an outline of the method for specifying the location of the failure will be discussed. When the failure such as the line disconnection or the node failure occurs, the specific signal pattern cannot be detected, and therefore, the nodes located on the lower stream from where the failure has occurred, detect the failure, because the specific signal pattern cannot be detected (Detection Phase). The node which has detected the failure, sends the notification signal to notify the other nodes that the failure has occurred (Failure Occurrence Notification Phase). Then, nodes which have detected occurrence of the failure, each transmits the specifying signal, thereby deciding whether or not the failure has occurred just above itself (Check Phase 1) The node, which is not the lower-most stream node, when deciding that the failure has occurred just above itself, transmits an ID packet including ID information of itself, or otherwise, it relays the received ID packet (Check Phase 2). The lower-most stream nodes each decides the failure status of the corresponding loop from a received ID packet, and transmits a decision result in the form of the ID packet. It is necessary that time-shared slots used for transmitting the ID packet be provided for each of the lower-most stream nodes in order to avoid collision of the ID packets transmitted from the lower-most stream nodes (Check Phase 3). From the ID packets transmitted from the lower-most stream nodes, every node recognizes the status of failure (Specifying Phase). A recovering process is performed by selecting the alternative master node as necessary (Recovering Phase).

Figure 2:
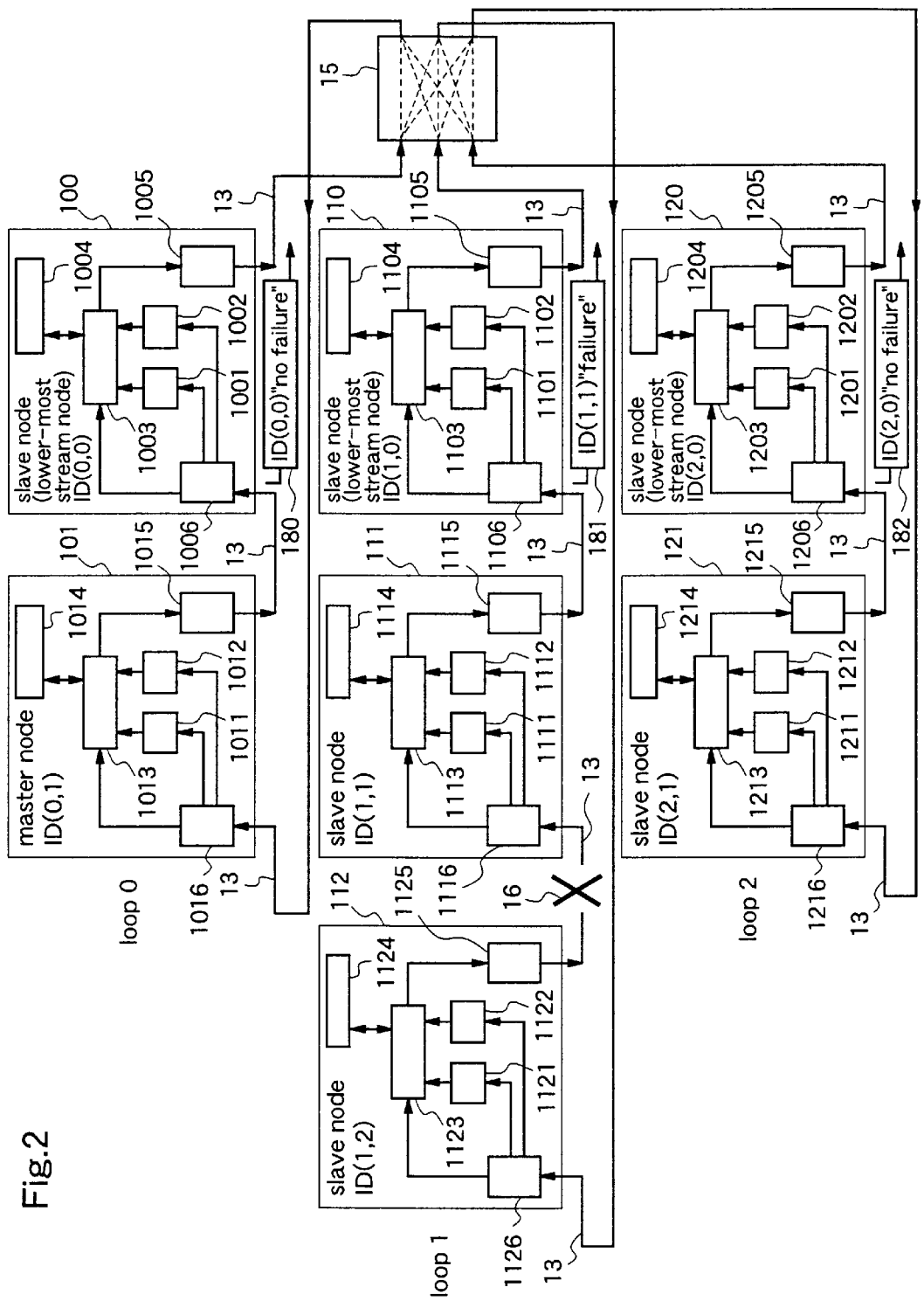
FIG. 2 is a diagram showing a state in which a line disconnection failure 16 has occurred in the network system of the first embodiment.
Figure 3:
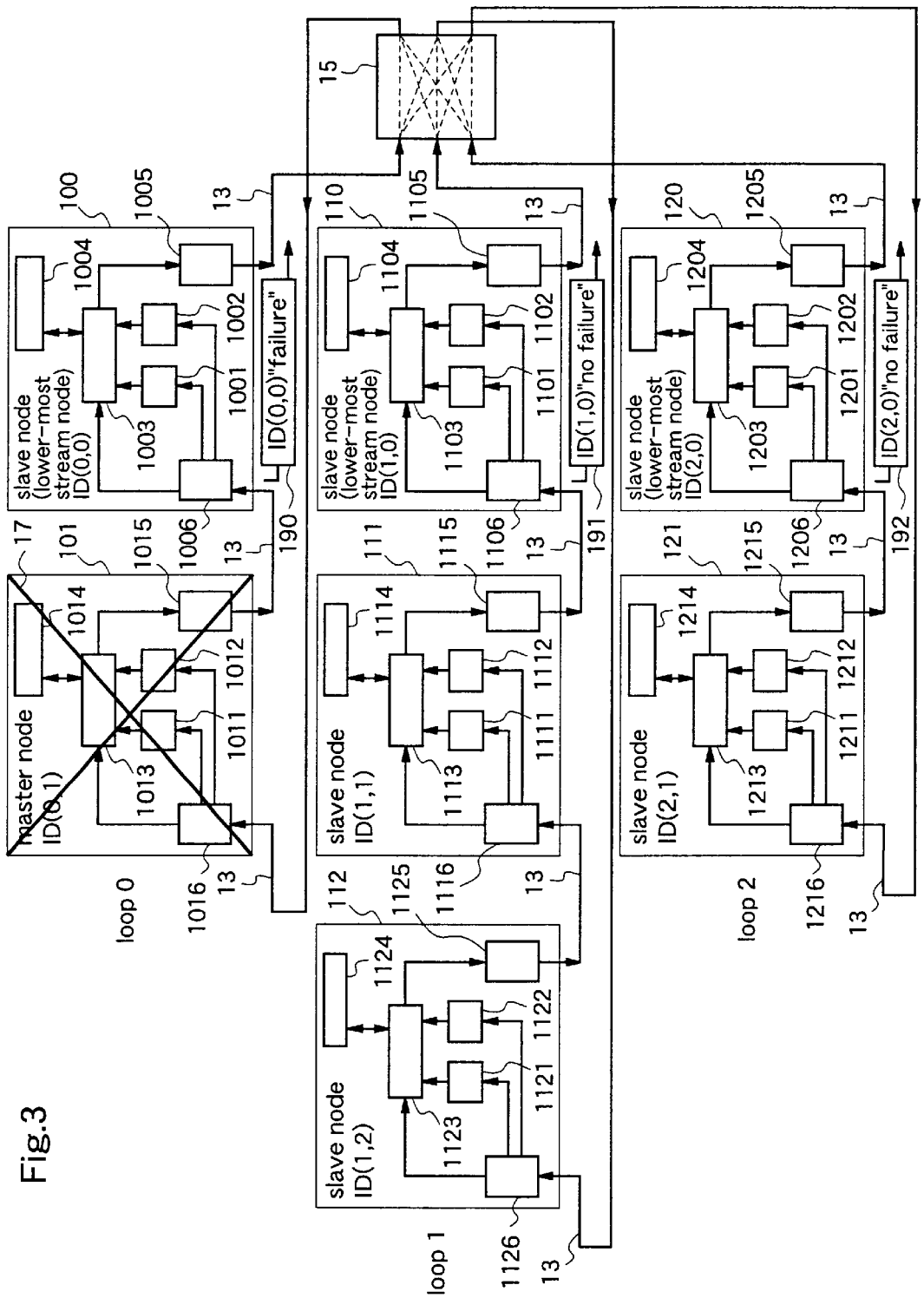
FIG. 3 is a diagram showing a state in which a node failure 17 has occurred in the network system of the first embodiment.

FIG. 2 shows a case where the line disconnection failure 16 has occurred on the transmission line between the nodes 111 and 112 in the network system of the first embodiment. FIG. 3 shows a case where the node failure 17 has occurred at the node 101 in the network system of the first embodiment. With reference to FIGS. 2 and 3, detection of the failures and recovering from the failures are described in detail.

(Detection Phase)

How the location of line disconnection failure 16 is specified will be explained with reference to FIG. 2. Due to the line disconnection failure 16, the nodes 110 and 111 do not receive the signal including the specific signal pattern or the packet. Therefore, each of the detection means 1101 of the node 110 and the detection means 1111 of the node 111 outputs the signal indicating "undetection", after the specific signal pattern has not been received during more than a fixed time period. According to this signal, each of the controls means 1103 of the node 110 and the control means 1113 of the node 111 detects occurrence of the failure. At this time, each of the signal monitoring means 1102 of the node 110 and the signal monitoring means 1112 of the node 111 outputs "0" as the monitor signal, because there is no signal transmitted on the transmission line. It should be noted that the fixed time period (elapsed time from when the specific signal pattern is not received until the signal indicating "undetection" is output) may be zero. In other words, the detection means may output the signal indicating "undetection" immediately when the specific signal pattern is not received at time when it is to be received.

(Failure Occurrence Notification Phase)

When each of the control means 1103 of the node 110 and the control means 1113 of the node 111 detects occurrence of the failure according to the signal indicating "undetection", and the monitor signal is "0", since there is a possibility that the failure has occurred only on the upper stream in the corresponding loop and the other nodes have not detected occurrence of the failure, it outputs a notification signal to notify the other nodes of occurrence of the failure. The notification signal is a signal remaining at High level during more than a fixed time period.

The notification signal output from the control means 1113 of the node 111 is sent to the transmission means 1115, which transmits the notification signal toward the transmission line. Likewise, the notification signal output from the control means 1103 of the node 110 is sent to the transmission means 1105, which transmits the notification signal toward the transmission line. The notification signal output from the node 110 branches in the optical star coupler 15, and the resulting signals are transmitted to the nodes 101, 112, and 121. While the specific signal pattern output from the master node 101 and the notification signal output from the node 110 collide on the optical star coupler 15, the notification signal is the signal at High level for a fixed period of time, and therefore, this collision results in a signal at High level.

In each of the nodes 101, 112, and 121, the notification signal output from the node 110 interferes with receiving the specific signal pattern output from the master node 101. Thereby, the nodes 101, 112, and 121 do not receive the specific signal pattern. Since the node 101 does not receive the specific signal pattern, the node 100 as the lower-stream node of the node 101 does not receive the specific signal pattern. Likewise, the node 120 as the lower-stream node of the 121 does not receive the specific signal pattern.

When more than a fixed time period ends after the respective nodes do not receive the specific signal pattern, the detection means 1001 of the node 100, the detection means 1011 of the node 101, the detection means 1121 of the node 112, the detection means 1201 of the node 120, and the detection means 1211 of the node 121, each outputs the signal indicating "undetection". According to this signal, the control means 1003 of the node 100, the control means 1013 of the node 101, the control means 1123 of the node 112, the control means 1203 of the node 120, and the control means 1213 of the node 121, each detects occurrence of the failure. At this time, the signal monitoring means 1002 of the node 100, the signal monitoring means 1012 of the node 101, the signal monitoring means 1122 of the node 112, the signal monitoring means 1202 of the node 120, and the signal monitoring means 1212 of the node 121, each outputs "1" as the monitor signal, because there is the notification signal transmitted on the transmission line. When occurrence of the failure is detected according to the signal indicating "undetection", and the monitor signal is "1", it is decided that the notification signal has notified that the failure has occurred, and therefore, the notification signal will not be output. Thus, every node in the network system detects occurrence of the failure.

(Check Phase 1)

After the "Failure Occurrence Notification Phase", the control means outputs a specifying signal. The specifying signal is a signal for specifying the location of the failure, and in this embodiment, is a signal remaining at High level during more than a fixed time period. When the control means of every node detects the failure, and outputs the specifying signal, the corresponding transmission means transmits the specifying signal toward the transmission line. When every node outputs the specifying signal, the signal monitoring means in each of the nodes other than the node 111 just below the line disconnection failure 16, detects the existence of the signal on the transmission line based on the specifying signal, and outputs the monitor signal "1". At the node 111, the signal monitoring means continues detecting "loss of the signal", and therefore, outputting the monitor signal "0". In this phase, the node (node 111), the monitor signal of which is "0" knows that the failure has occurred just above itself.

(Check Phase 2)

In "Check phase 2", the nodes other than the lower-most stream nodes operate. The control means of the node which is not the lower-most stream node, when the monitor signal remains "0" in the "Check Phase 1", decides that the failure has occurred at the node or the transmission line just above the corresponding node, and outputs an ID packet including the corresponding node ID stored in the storage means. The transmission means transmits the ID packet toward the transmission line.

Figure 5:
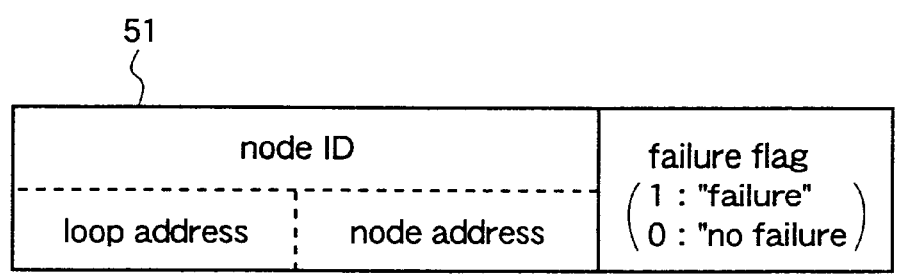
FIG. 5 is a diagram showing a structure of an ID (identifier) packet.

FIG. 5 shows a format of the ID packet. The ID packet comprises a node ID composed of a loop address and a node address, and a field of a failure flag. The failure flag has a value "1" or "0". The "1" indicates that the failure has occurred, while the "0" indicates that no failure occurs.

The control means of each of the nodes other than the lower-most stream nodes, when the monitor signal is "1", decides that no failure occurs at the node or the transmission line just above the corresponding node, and does not output the ID packet of the corresponding node but relays a received ID packet. In this case, only in the node 111 just below the line disconnection failure 16, the monitor signal "0" is output. Since the node ID of the node 111 is (1,1), the control means 1113 outputs an ID packet comprising a loop address "1", a node address "1", and a failure flag "1". The transmission means 1115 transmits the ID packet toward the transmission line.

(Check Phase 3)

In "Check Phase 3", the lower-most stream nodes operate. The control means of each of the lower-most stream nodes decides a failure status of the corresponding loop, and after waiting time according to the corresponding ID, it transmits an ID packet indicating a decided failure status. The control means of each of the lower-most stream nodes, decides the failure status of the corresponding loop as illustrated in the following cases 1–3.

Case 1.

When the monitor signal is "1" in the Check Phase 1, no failure occurs at the node or the transmission line just above the corresponding node. In this state, when the corresponding node receives an ID packet, the control means decides that the failure has occurred on the upper stream from the node having the node ID included in the received ID packet. Hence, the received ID packet is transmitted.

Case 2.

When the monitor signal is "1" in the Check Phase 1, no failure occurs at the node or the transmission line just above the corresponding node. In this case, when the corresponding node receives no ID packet, the control means decides that no failure occurs in the corresponding loop. In order to demonstrate that no failure occurs in the corresponding loop, the control means transmits an ID packet comprising a loop address "loop address of the corresponding loop" and the failure flag "0". "0" is transmitted as the node address herein, although an arbitrary number may be used.

Case 3.

When the monitor signal is "0" in the Check Phase 1, the control means decides that the failure has occurred at the node or the transmission line just above the corresponding node. Therefore, the control means transmits an ID packet comprising a loop address "loop address of the corresponding node", a node address "node address of the corresponding node" and a failure flag "1".

It is required that the "waiting time according to the corresponding ID" be determined such that the ID packets transmitted from the respective lower-most stream nodes do not collide on the common transmission line 15. This waiting time "Wait" will be expressed as follows. Assuming that the largest difference of time when the lower-most stream nodes in the respective loops completes decision on failure statuses of the corresponding loops is "Margin", elapsed time from start of transmission of an ID packet until completion of transmission of the ID packet is "Length", and a loop address of the lower-most stream node which transmits the ID packet is "Loop_Adr", $$\text{Wait}=(\text{Margin}+\text{Length})\times \text{Loop\_Adr} \qquad (1)$$

Figure 6:
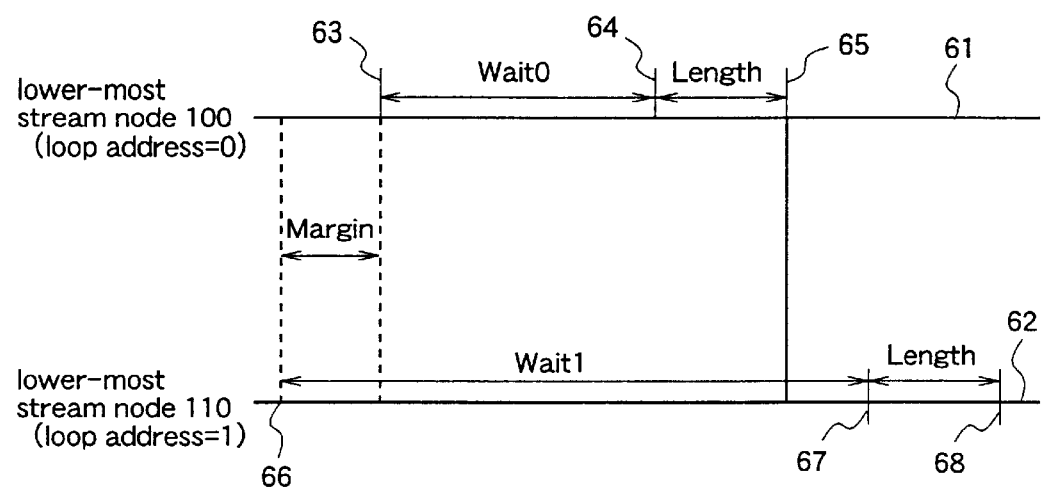
FIG. 6 is a diagram for explaining Wait time.

If the waiting time of the lower-most stream nodes is set according to the expression (1), then the ID packets transmitted from the respective lower-most stream nodes will not collide on the common transmission line 15. This will be explained with reference to FIG. 6. Hereinafter, suppose that a loop address is one of "zero and positive integers". In FIG. 6, 61 denotes a time axis of the lower-most stream node 100 whose loop address is "0". 62 denotes a time axis of the lower-most stream node 110 whose loop address is "1". 63 denotes time at which the lower-most stream node 100 completes decision on the failure status of the corresponding loop. 64 denotes time at which the lower-most stream node 100 starts outputting the ID packet. 65 denotes time at which the lower-most stream node 100 completes outputting the ID packet. 66 denotes time at which the lower-most stream node 110 completes decision on the failure status of the corresponding loop. 67 denotes time at which the lower-most stream node 110 starts outputting the ID packet. 68 denotes time at which the lower-most stream node 110 completes outputting the ID packet. Assume that waiting time of the lower-most stream node 100 is "Wait 0" and waiting time of the lower-most stream node 110 is "Wait 1". The lower-most stream node 110 completes decision on the failure status of the corresponding loop, and then the lower-most stream node 100 completes decision on the failure status of the corresponding loop. In this case, when time difference between them is the largest, that is, equal to the "Margin", it is necessary that the ID packet of the lower-most stream node 100 and the ID packet of the lower-most stream node 110 do not collide on the common transmission line 15. So, the time 67 is set behind the time 65. In this case, from FIG. 6, derived is:

$$\text{Margin}+\text{Wait0}+\text{Length}<\text{Wait1} \qquad (2)$$

From the expression (2), derived is:

$$\text{Wait1}-\text{Wait0}>\text{Margin}+\text{Length} \qquad (3)$$

The expression (3) shows that time difference between the waiting time of the lower-most stream node 100 and the waiting time of the lower-most stream node 110 which outputs the ID packet subsequently to the node 100 is larger than "Margin+Length". From this fact, the expression (1) is derived. It is preferable to set the "Margin" larger in view of transmission delay in respective loops or time necessary for detecting occurrence of the failure according to the notification signal.

Thus, the respective lower-most stream nodes decide failure statuses of the corresponding loops, and transmit the ID packets in the time sharing manner. In this embodiment, the lower-most stream node 100 makes decision as shown by the Case 2, and transmits an ID packet 180 comprising a loop address "0", a node address "0", and a failure flag "0" ("0" indicates that no failure occurs). The lower-most stream node 110 makes decision as shown by the Case 1, and transmits an ID packet 181 comprising a loop address "1", a node address "1", and a failure flag "1" ("1" indicates that a failure has occurred). The lower-most stream node 120 makes decision as shown by the Case 2, and transmits an ID packet 182 comprising a loop address "2", a node address "0", and a failure flag "0".

(Specifying Phase)

Each of the nodes 100, 101, 112, 120, and 121 receives the ID packets transmitted from the lower-most stream nodes and knows that no failure occurs in the loops 0 and 2, and the failure has occurred just above the node (1, 1) in the loop 1. The node 111 located on the lower stream from the line disconnection failure 16, does not receive the ID packets from the lower-most stream nodes, but, since the monitor signal is "0" in the "Check Phase 1", the node 111 knows that the failure has occurred just above itself, i.e., the node (1, 1) in the loop 1. The node 110 located on the lower stream from the line disconnection failure 16 does not receive the ID packets transmitted from the lower-most stream nodes, either, but knows that the failure has occurred just above the node (1, 1) in the loop 1 from the ID packet transmitted from the node 111.

(Recovering Phase)

When the location of the failure is specified according to the ID packets transmitted from the lower-most stream nodes, recovering operation from the failure is performed as required. In this network of this embodiment, nodes in the loop where the failure such as line disconnection or the node failure has occurred, cannot perform communication normally, but nodes in the loop where no failure occurs can perform communication normally. Therefore, the nodes 110, 111, and 112 which decide that the failure has occurred in the corresponding loop, stop the following communication operation and leave the network system, and the nodes 100, 101, 120 and 121 in normal loops reconstruct the network system, whereby the recovering operation from the failure is performed. When the master node 101 completes specifying the location of the failure, it resumes outputting the specific signal pattern, and the network returns to normal operation.

As described above, when the line disconnection failure 16 has occurred between the nodes 111 and 112, the location of the failure is detected and the loop where the failure has occurred leaves from the network system, whereby recovering from the failure is performed.

Hereinafter, a description will be given of a method for specifying a location of a failure for the case where the node failure 17 occurs at the node 101. As in the case of the line disconnection failure, initially, "Detection Phase" will be described.

(Detection Phase)

Here it is assumed that nodes do not transmit and relay signals due to occurrence of the failure. Due to the node failure 17 at the master node, the nodes 100, 110, 111, 112, 120 and 121 do not receive the specific signal pattern. Hence, the detection means 1001 of the node 100, the detection means 1101 of the node 110, the detection means 1111 of the node 111, the detection means 1121 of the node 112, the detection means 1201 of the node 120, and the detection means 1211 of the node 121, each outputs the signal indicating "undetection", when it has not received the specific signal pattern during more than a fixed time period. According to this signal, the control means 1003 of the node 100, the control means 1103 of the node 110, the control means 1113 of the node 111, the control means 1123 of the node 112, the control means 1203 of the node 120, and the control means 1213 of the node 121, each detects occurrence of the failure. At this time, the signal monitoring means 1002 of the node 100, the signal monitoring means 1102 of the node 110, the signal monitoring means 1112 of the node 111, the signal monitoring means 1122 of the node 112, the signal monitoring means 1202 of the node 120, and the signal monitoring means 1212 of the node 121, each outputs the monitor signal "0", because there is no signal transmitted on the transmission line.

(Failure Occurrence Notification Phase)

Upon detecting occurrence of the failure according to the signal indicating "undetection", the control means 1003 of the node 100, the control means 1103 of the node 110, the control means 1113 of the node 111, the control means 1123 of the node 112, the control means 1203 of the node 120, and the control means 1213 of the node 121, each outputs the notification signal, since the monitor signal is "0", like the line disconnection failure. In this case, all the nodes other than the failure node 101 have detected the failure, and therefore, there is no node which detects occurrence of the failure according to the notification signal. In this manner, all the nodes other than the failure node 101 detect occurrence of the failure.

(Check Phase 1)

Like the line disconnection failure, after the "Failure Occurrence Notification Phase", the control means outputs the specifying signal. The control means of each of the nodes other than the failure node 101 detects occurrence of the failure and outputs the specifying signal. Then, the transmission means of each of the nodes other than the failure node 101, transmits the specifying signal toward the transmission line. When each of the nodes other than the failure node 101 outputs the specifying signal, signal monitoring means of each of the nodes other than the node 100 just below the node failure 17 and the failure node 101 detects the existence of the signal on the transmission line based on the specifying signal, and outputs the monitor signal "1". At the node 100, the signal monitoring means 1002 continues detecting loss of the signal due to the node failure 17, and therefore, continues outputting the monitor signal "0". In this phase, the node 100 knows that the failure has occurred just above itself, because the monitor signal is "0".

(Check Phase 2)

Like the line disconnection failure, in the Check Phase 2, nodes other than the lower-most stream nodes operate. In this case, at the nodes 111, 112, and 121 other than the failure node 101 and the lower-most stream nodes 100, 110, and 120, the monitor signal is "1", and therefore, these nodes 111, 112, and 121, do not output ID packets.

(Check Phase 3)

Like the line disconnection failure, in the "Check Phase 3", the lower-most stream nodes operate. The control means of each of the lower-most stream nodes decides the failure status of the corresponding loop, and after the waiting time according to the corresponding ID, it transmits an ID packet indicating the decided failure status. The control means of each of the lower-most stream nodes decides the failure status like the line disconnection failure. When the node failure 17 occurs as shown in FIG. 3, the lower-most stream node 100 makes decision as shown by the case 3, and outputs an ID packet 190 comprising a loop address "0", a node address "0", and a failure flag "1" (failure flag="1", indicating that the failure has occurred). The lower-most stream node 110 makes decision as shown by the case 2, and outputs an ID packet 191 comprising a loop address "1", a node address "0", and a failure flag "0" (failure flag="0" indicating that no failure occurs). The lower-most stream node 120 makes decision as shown by the case 2, and outputs an ID packet 192 comprising a loop address "2", a node address "0", and a failure flag "0"

(Specifying Phase)

The nodes 110, 111, 112, 120, and 121, each receives the ID packets transmitted from the lower-most stream nodes, and knows that no failure occurs in the loops 1 and 2, and the failure has occurred just above the node (0, 0) in the loop 0. The node 100 located on the lower stream from the node failure 17 does not receive the ID packets transmitted from the lower-most stream nodes, but since the value of the monitor signal is "0" in the "Check Phase 1", the node 100 knows that the failure has occurred just above itself, that is, just above the node (0, 0) in the loop "0".

(Recovering Phase)

As described above, the location of the failure is specified according to the ID packets transmitted from the lower-most stream nodes, like the line disconnection failure, recovering operation from the failure is performed as required. When the node failure 17 has occurred, the node 100 which decides that the failure has occurred in the corresponding loop, stops the following communication operation and leaves the network system. In this network of this embodiment, nodes in the loop where the failure such as the line disconnection or the node failure has occurred, cannot perform communication normally, but nodes in the loop where no failure occurs can perform communication normally. Therefore, in a case where the failure has occurred in the loop including the master node like the node failure 17, an alternative master node is selected from nodes in the loop which performs communication normally. It is decided whether or not the failure has occurred in the loop including the master node, from the node ID (0, 1) of the master node stored in the storage means. In this case, it is decided that the failure has occurred in the loop including the master node from the fact that the failure has occurred in the loop "0" and the loop address of the master node is "0".

Hereinafter, how the alternative master node is selected will be explained. When each of the slave nodes 110, 111, 112, 120, and 121 in the loops where no failure occurs, detects the failure in the loop including the master node, it waits during "waiting time according to the corresponding node ID". The node which has waited during the "waiting time", operates as the alternative master node, and starts outputting the specific signal pattern. Receiving the specific signal pattern, the other nodes know that the master node returns to the network, and thereby operate as slave nodes. The node which is to operate as the alternative master node, may output a packet which declares that it will operate as the alternative master node rather than outputs the specific signal pattern. Receiving this packet, the other nodes may detect the return of the master node, and operate as the slave nodes.

Here it is assumed that "the waiting time according to the corresponding node ID" is a product of a fixed time period "T" and the node ID (the corresponding node ID*T) The node ID (1, 0) is handled as "10", and the node ID (2, 1) is handled as "21". Assuming that a node ID of the alternative master node is "K" (integer), it is necessary that the fixed time period "T" be set such that waiting time of a node having a node ID (integer) larger than "K" ends after the specific signal pattern output from the alternative master node having the node ID (K) has been sent to all the nodes in the normal loops.

Figure 7:
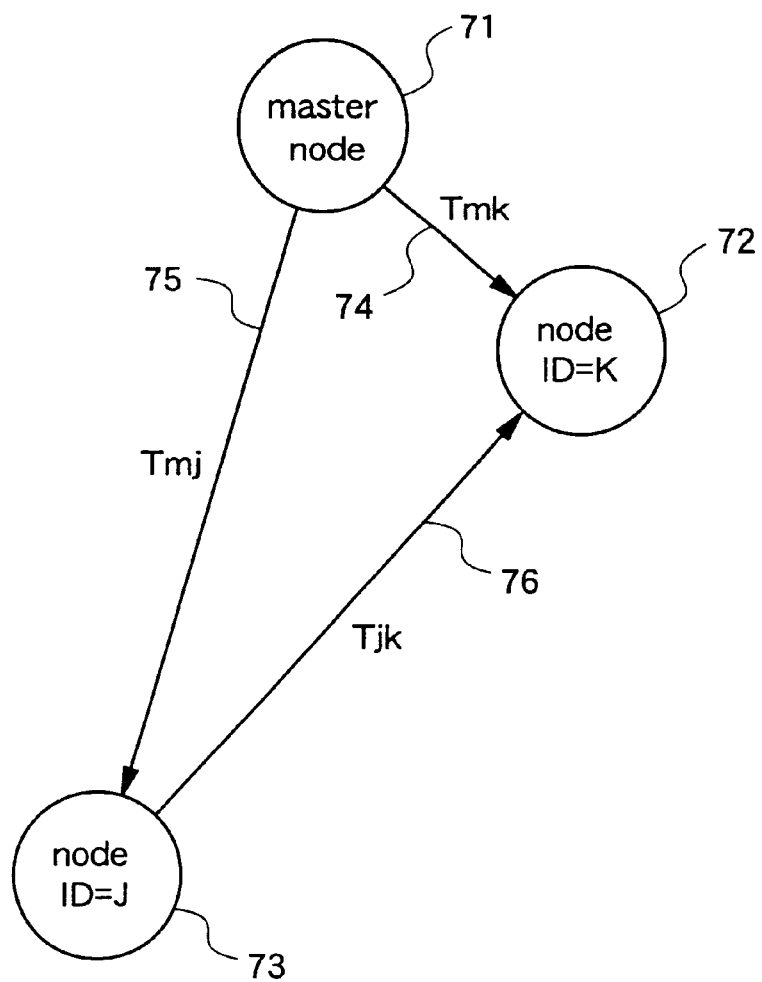
FIG. 7 is a diagram for explaining conditions to be satisfied by a fixed time period "T" of the first embodiment.

The conditions to be satisfied by the "T" will be explained with reference to FIGS. 7 and 8. In description below, assume that the node ID is "one of zero and positive integers" and a fixed time period from when the node does not receive the specific signal pattern until it outputs the signal indicating "undetection" is "Tw". In FIG. 7, 71 denotes a master node, 72 denotes a node having a node ID "K", 73 denotes a node having a node ID "J", 74 denotes a path from the master node 71 to the node 72, 75 denotes a path from the master node 71 to the node 73, and 76 denotes a path from the node 73 to the node 72. In addition, transmission delay time of the path 74 is "Tmk", transmission delay time of the path 75 is "Tmj", and transmission delay time of the path 76 is "Tjk".

Figure 8:
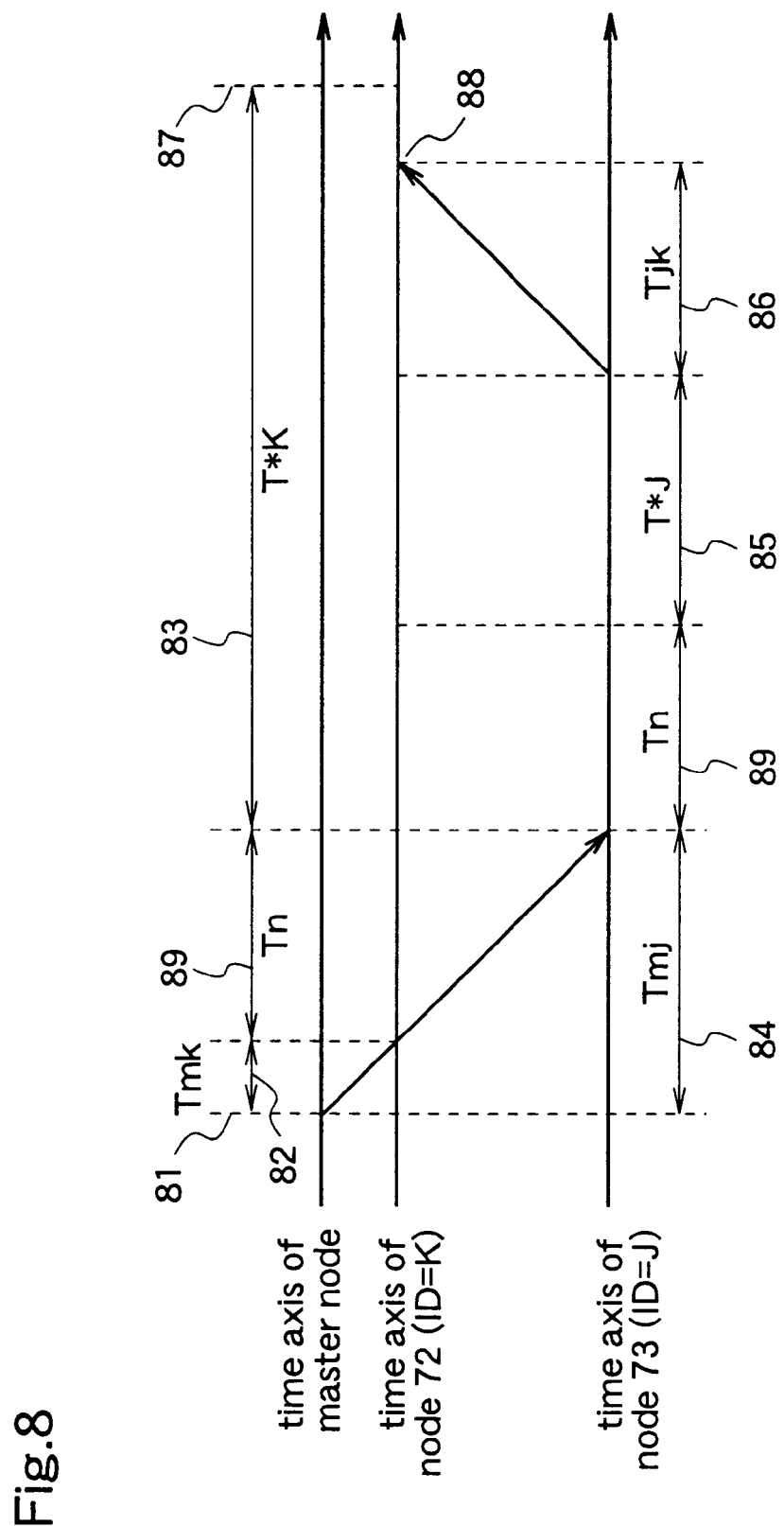
FIG. 8 is a diagram for explaining conditions to be satisfied by the fixed time period "T" of the first embodiment.

Turning to FIG. 8, 81 denotes time at which a first specific signal pattern is to be output, after occurrence of the failure in the loop including the master node, 82 denotes the delay time (Tmk) of transmission from the master node 71 to the node 72, 83 denotes waiting time (T*K) of the node 72, 84 denotes the delay time (Tmj) of transmission from the master node 71 to the node 73, 85 denotes waiting time (T*J) of the node 73, 86 denotes delay time (Tjk) of transmission from the node 73 to the node 72, 87 denotes time at which the node 72 is to start outputting the specific signal pattern as the alternative master node, and 88 denotes time at which the specific signal pattern output from the alternative master node 73 arrives at the node 72. In addition, 89 denotes a time period (Tn) required for processing in the "Detection Phase", "Failure Occurrence Notification Phase", "Check Phase 1", "CheckPhase 2", "Check Phase 3", and "Specifying Phase".

A description will be give of a case where a failure occurs in a loop including a master node at specified time. Assume that the first specific signal pattern is to be output at time "0" after occurrence of the failure in the loop including the master node. (The time "0" corresponds to 81 shown in FIG. 8. When the network operates normally, the specific signal pattern output from the master node is received by every node at regular time intervals). Due to loss of the specific signal pattern which should be transmitted from the master node 71 at regular time intervals, the node 72 detects the failure in the network at time "Tmk+Tw", and detects the failure at the master node 71 at "Tmk+Tn" when specifying the location of the failure is completed. Likewise, the node 73 detects the failure in the network at time "Tmj+Tw", and detects the failure at the master node 71 at time "Tmj+Tn" when specifying the location of the failure is completed. The waiting time of the node 72 is T*K (corresponding to 83 in FIG. 8), and the waiting time of the node 73 is T*J (corresponding to 85 in FIG. 8). When "J"is smaller than "K" (priority of the node 73 having the node ID=J is higher), it is necessary that the specific signal pattern transmitted by the node 73 after the (T*J)waiting time (corresponding to 85 in FIG. 8) arrive at the node 72 by the time the waiting time of the node 72 ends, and thereby the node 72 detects return of the master node. In FIG. 8, the end of the waiting time of the node 72 is represented as 87, and the time at which the specific signal pattern transmitted from the node 73 arrives at the node 72 is represented as 88. Therefore, "T" which satisfies:

$$Tmj+Tn+T*J+Tjk<Tmk+Tn+T*K \qquad (4) \text{ is set.}$$

From the expression (4), derived is:

$$T>(Tmj+Tjk-Tmk)/(K-J) \qquad (5)$$

When the value for a right side of the expression (5) is the largest, K=J+1. From this, derived is:

$$T>Tmj+Tjk-Tmk \qquad (6)$$

When the value for a right side of the expression (6) is the largest, "Tmj" and "Tjk" are the largest and "Tmk" is the smallest. Assuming that the largest transmission delay time between nodes is T1, the second-largest transmission delay time is T2 (T2 may be equal to T1), and the smallest is Tm, "T" which satisfies "T">"T1+T2−Tm" is generally adopted. In this case, $$2*T1>T1+T2-Tm>Tmj+Tjk-Tmk \qquad (7)$$

is established. So, as a simple example of the "T" which satisfies the expression (6), "twice as much as the largest value of the transmission delay time between nodes" is illustrated.

When the "twice as much as the largest value of the transmission delay time between nodes" is adopted as "T", the specific signal pattern transmitted from the alternative master node having the node ID="K" is sent to all the nodes in the network, and then the waiting time of the node having the node ID larger than K ends. For this reason, the node having the node ID larger than "K" cannot start outputting the specific signal pattern. The node having the node ID "K", before starting operation as the alternative master node, knows that there are no candidate nodes for the alternative master node which have priorities higher than that of the node having the node ID=K.

In the network shown in FIG. 3, the node, the waiting time of which is the shortest, among the slave nodes in the loops where no failure occurs, is the slave node 110. Therefore, the slave node 110 starts outputting the specific signal pattern as the alternative master node after "T*10" waiting time.

The slave node 111, the waiting time of which is the second shortest, receives the specific signal pattern output from the slave node 110 before starting outputting the specific signal pattern after the waiting time, and therefore returns to normal operation as the slave node. Likewise,the slave nodes 112, 120, and 121 return to normal operation as the slave nodes. The node 110 sets information indicating that it is the master node, in the storage means 1104, and after this setting, operates as the master node.

As described above, when the node failure 17 occurs as shown in FIG. 3, the nodes in the loop where the failure has occurred leave the network, and the alternative master node is selected, and thereby the nodes 110, 111, 112, 120, and 121 in the normal loops reconstruct the network, whereby recovering from the failure is performed.

While the "waiting time according to the node ID" when selecting the alternative master node is "the corresponding node ID*T), the waiting time is not limited to this. Any "t" may be adopted on condition that priorities are determined according to the node IDs, the alternative master node candidate is selected in descending order of the priorities, and before information indicating that a node of a priority starts operation as the alternative master node is sent to all the nodes, a node of a lower priority does not start operation as the alternative master node. For example, "fixed time period+the corresponding node ID*the corresponding node ID*T" may be adopted.

In addition, while in this embodiment, the nodes ID are used as an element for determining the priorities used for selecting the alternative master node, the node IDs may be replaced by a predetermined priority value for a master node, whereby the alternative master node is selected likewise.

Further, in order to facilitate recovering from the failure, waiting time of a node of "the highest priority among all nodes in the network system" may be set to "0". Thereby, as soon as the node of the highest priority recognizes that the alternative master node needs to be selected, it operate as the alternative master node. If the node of the highest priority operates as the alternative master node immediately and normal data communication is resumed, the node of the highest priority may hold communication management information of the master node. The communication management information includes, for example, channel information set for nodes (transmission node ID, receiving node ID), band information, and the like.

In some networks, only the node which satisfies a specific condition serves as the alternative master node. In such networks, only the node which satisfies the specific condition is selected as the candidate for the alternative master node.

While in this embodiment all the slave nodes have capabilities of operating as the candidates for the alternative master node, if only the nodes 100, 110, and 120 have capabilities of operating as the candidates for the alternative master node, and the other slave nodes 111, 112, and 121 do not, the alternative master node can be selected likewise.

This is implemented in the following way. As for each of the slave nodes which have capabilities of operating as the candidates for the alternative master node, a "node address" in the corresponding node ID is set to "0". The slave nodes which have detected he failure of the master node, each operates as the candidate for the alternative master node when the corresponding node address is "0", and does not become the candidate for the alternative master node when the node address is not "0". Thereby, in the case shown in FIG. 1, only the slave nodes 100, 110, and 120 operate as the candidates for the alternative master node. Alternatively, the following is conceived. A flag indicating whether or not a node may operate as the candidate for the alternative master node, may be provided. The slave nodes are flagged such that a flag is set to "1" when the corresponding slave node may operate as the candidate for the alternative master node. The slave node which has detected the failure at the master node operates as the candidate for the alternative master node when the flag is set to "1", and does not operate as the candidate when the flag is set to "0".

When only a part of the slave nodes become the candidates for the alternative master node, "T" of the waiting time when the alternative master node is selected, may be determined by taking transmission delay time among the master node or the slave nodes as the candidates for the alternative master node into account.

Figure 9:
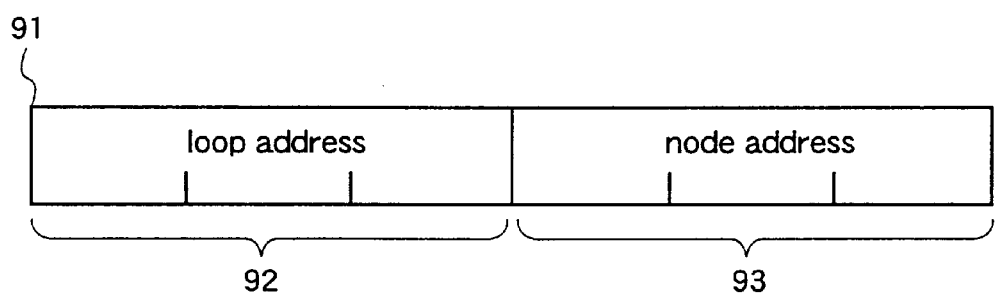
FIG. 9 is a diagram showing a structure of a node ID of the first embodiment.

In stead of the node ID, a bit stream corresponding to a portion of the node ID may be used. For instance, as shown in FIG. 9, in a node ID (91) represented as 6 bits, a "loop address" unique to the corresponding loop is represented as upper 3 bits (92) and a "node address" for identifying different nodes in the same loop is represented as lower 3 bits (93). When the loop address is thus included in the node ID, a node which would serve as the alternative master node may be limited to one in the corresponding loop (only the node in the corresponding loop which has an output directly connected to the common transmission line 15 serves as the alternative master node), and the waiting time may be set to "the loop address of the corresponding node*T".

In the network in which the slave nodes need to know the node ID of the master node, the alternative master node may notify all nodes of its node ID after the longest waiting time elapses.

While in this embodiment, the network shown in FIG. 1 is illustrated to explain how the location of the failure is specified and how the alternative master node is selected, construction of the network is not limited to this, and the number of loops, the number of nodes, the location of the master node and the like, in the network system, may be constructed arbitrarily. For instance, there may be provided a loop comprising a single node. The method for selecting the alternative master node is applicable to networks of a variety of topologies such as a bus type network, a loop type network, a star type network, a tree type network, and the like, as well as the network of the topology of the loop and bus.

When time intervals at which the specific signal pattern is received are each "Ti", the "Ti" need not be fixed. For instance, when the "Ti" is variable within the maximum value "Tmax", it may be decided that the failure has occurred from the fact the specific signal pattern is not received for a time period longer than the "Tmax". When the "Ti" is variable and time at which a next specific signal pattern is to be received is known, it may be decided that the failure has occurred from the fact that the specific signal pattern is not received at the time when the next specific signal pattern is to be received.

Any signal may be used as the specific signal pattern so long as it is distinguishable from data or various types of signals transmitted. For instance, this may be a synchronous signal used for recovering a clock synchronized with that of the master node, a special signal pattern distinguishable from data transmitted on the network, or a packet of a predetermined specific format. In case of the synchronous signal, there may be provided a PLL (Phase Locked Loop) circuit as the detection means, and an unlocking signal of the PLL may be used as the signal indicating "undetection". The master node may output a "communication control packet" including a transmission node ID as a node ID of a node which is allowed to transmit data and a receiving node ID as a node ID of a node which is allowed to receive transmitted data, at regular time intervals or at variable time intervals within a fixed time period. In the network in which the nodes gain the transmission right and the receiving right according to the "communication control packet", the specific signal pattern may be the "communication control packet". Or, in a network in which the master node makes transmission by making a frame of a fixed length go around with a cycle time of 44.1 KHz or the like, the specific signal pattern may be the frame of the fixed length.

How the lower-most stream nodes transmit the ID packets is not limited to transmission in the time sharing manner, unless receiving becomes impossible because the ID packets transmitted from the respective lower-most stream nodes collide. For instance, this collision is avoided by the fact that the respective lower-stream nodes make transmission at different frequencies.

In the above-described method, it is impossible to detect node failures at the lower-most stream nodes and line disconnection failures just below the lower-most stream nodes. In order to detect these failures, the master node 101 makes an inquiry on each of the lower-most stream nodes regularly in the normal communication state, and in response to this inquiry, the corresponding lower-most stream node provides an answer. In this case, the master node outputs an inquiry packet which specifies a target lower-most stream node. The target lower-most stream node, receiving the inquiry packet directed to itself, outputs a response be means of a response packet. The master node decides that the node failure has occurred at the target lower-most stream node or the line disconnection failure has occurred just below the target lower-most stream node when it does not receive the response packet. Further, to make the failure loop leave the network system, the master node outputs a packet indicating that the failure loop should leave the network system. The packet includes a loop address of a loop which should leave the network system. The node which receives this packet leaves the network system, when there is a match between the corresponding loop address and the loop address included in this packet.

As for the notification signal, any signal may be used so long as the other nodes can detect occurrence of the failure, and it is not limited to the signal which interferes with receiving of the specific signal pattern. For instance, the notification signal may have a frequency different from that of the signal for use in normal transmission. In this case, each of the nodes comprises means for transmitting this notification signal, and detection means of each node outputs a signal similar to the signal indicating "undetection" upon detecting this notification signal.

As for the specifying signal, any signal may be used so long as the node can decide whether or not the failure has occurred just above itself from the fact that it does not receive the specifying signal in the "Check Phase 1", and it is not limited to the signal remaining at High level during a fixed time period. For instance, the signal remaining at High level during a fixed time period and remaining at Low level during a fixed time period, which levels are repeated regularly, may be used.

Figure 10:
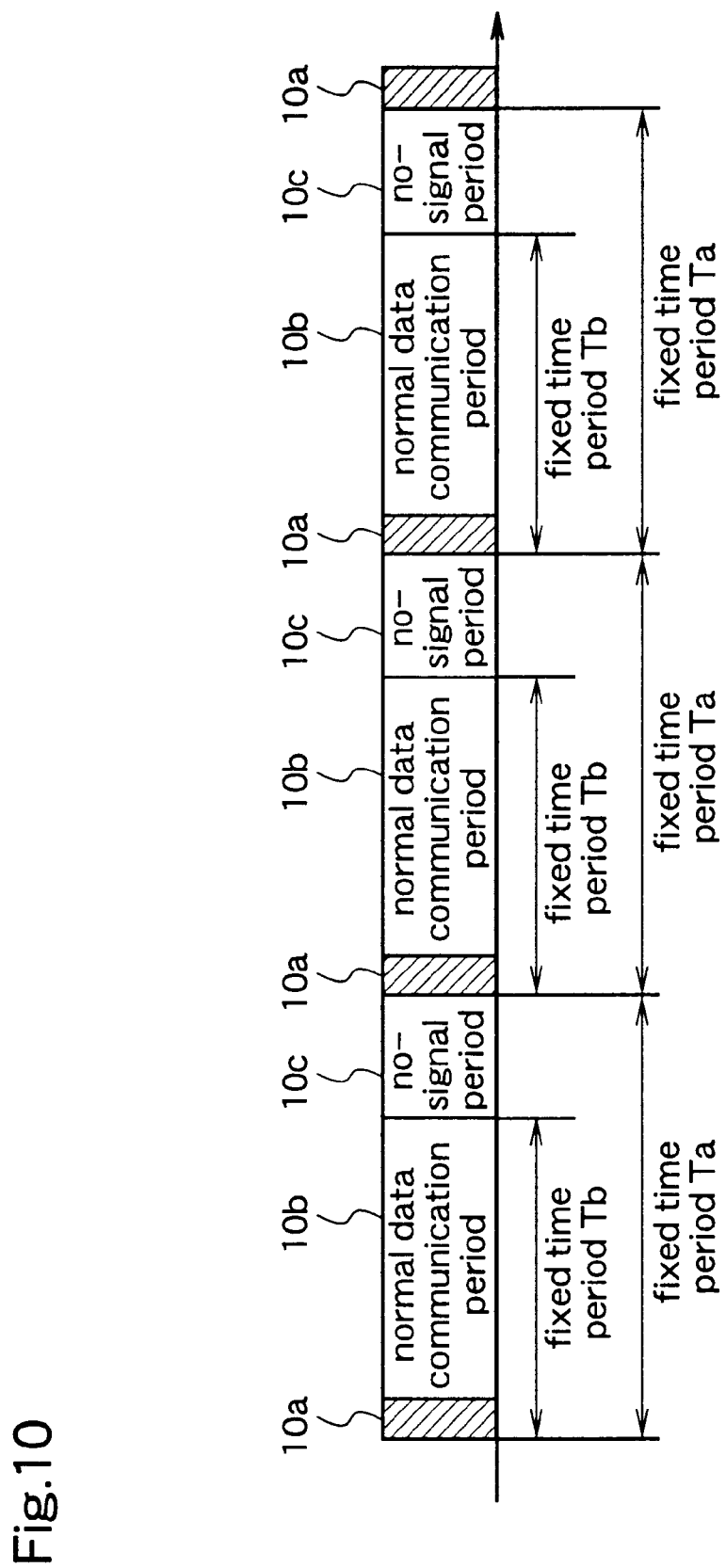
FIG. 10 is a diagram for explaining a time period during which no signal exist.
Figure 11:
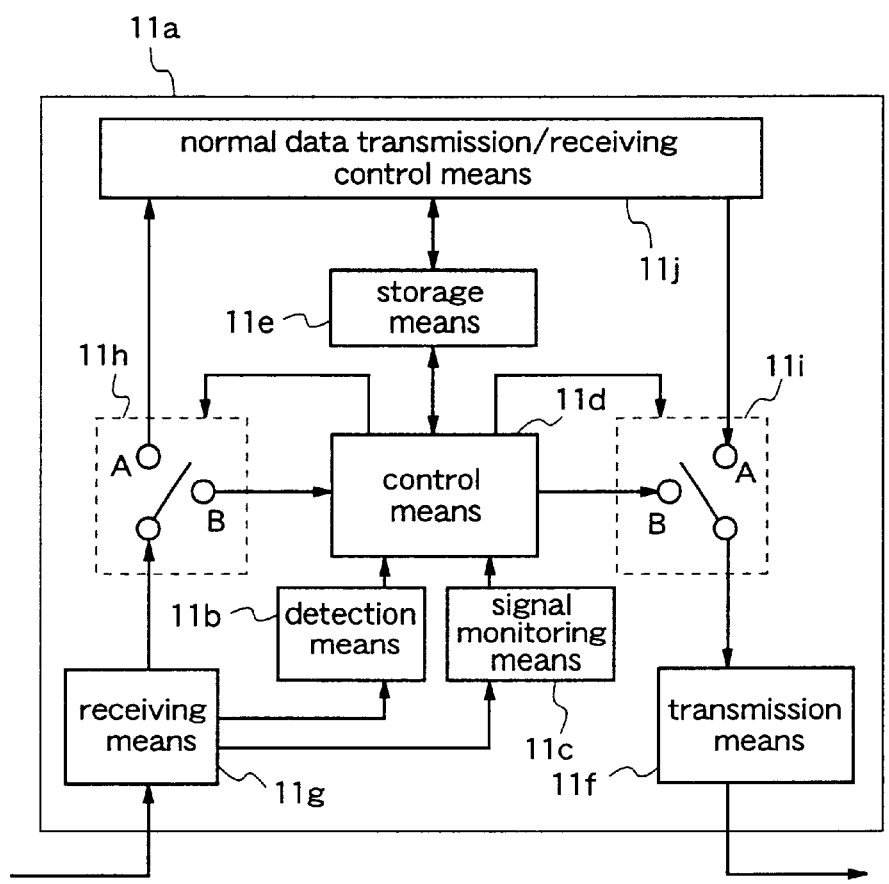
FIG. 11 is a diagram showing a structure of a node including switches.
Figure 12:
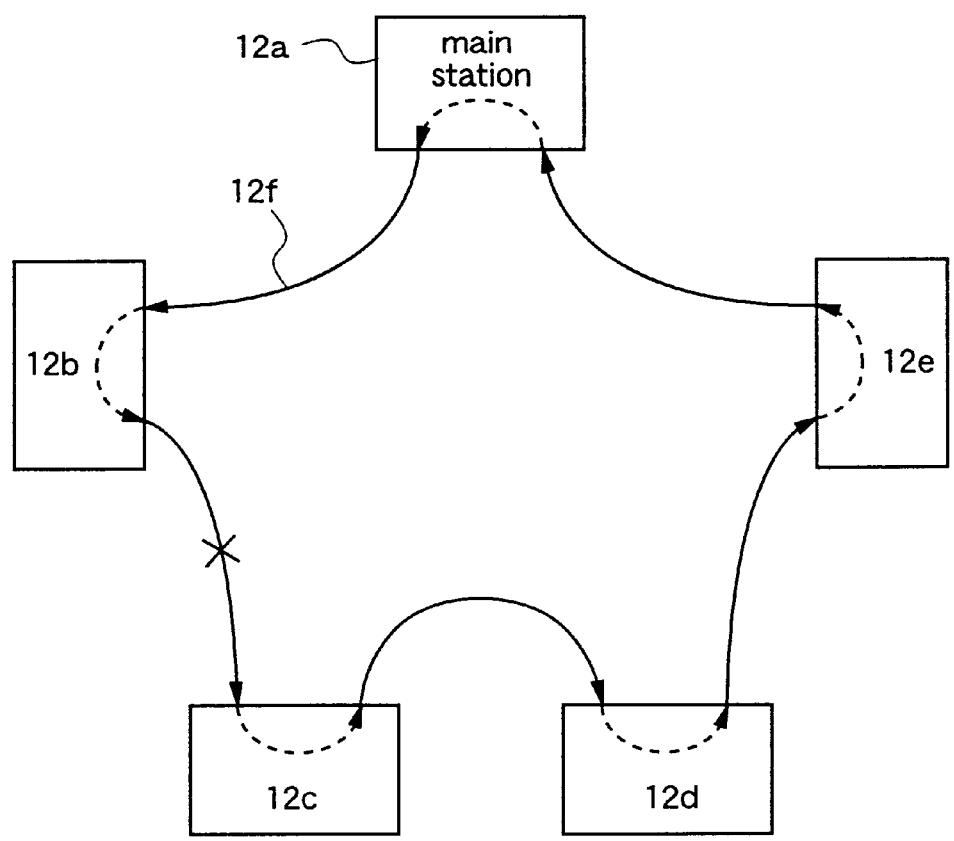
FIG. 12 is a diagram for explaining a conventional example.
Figure 13:
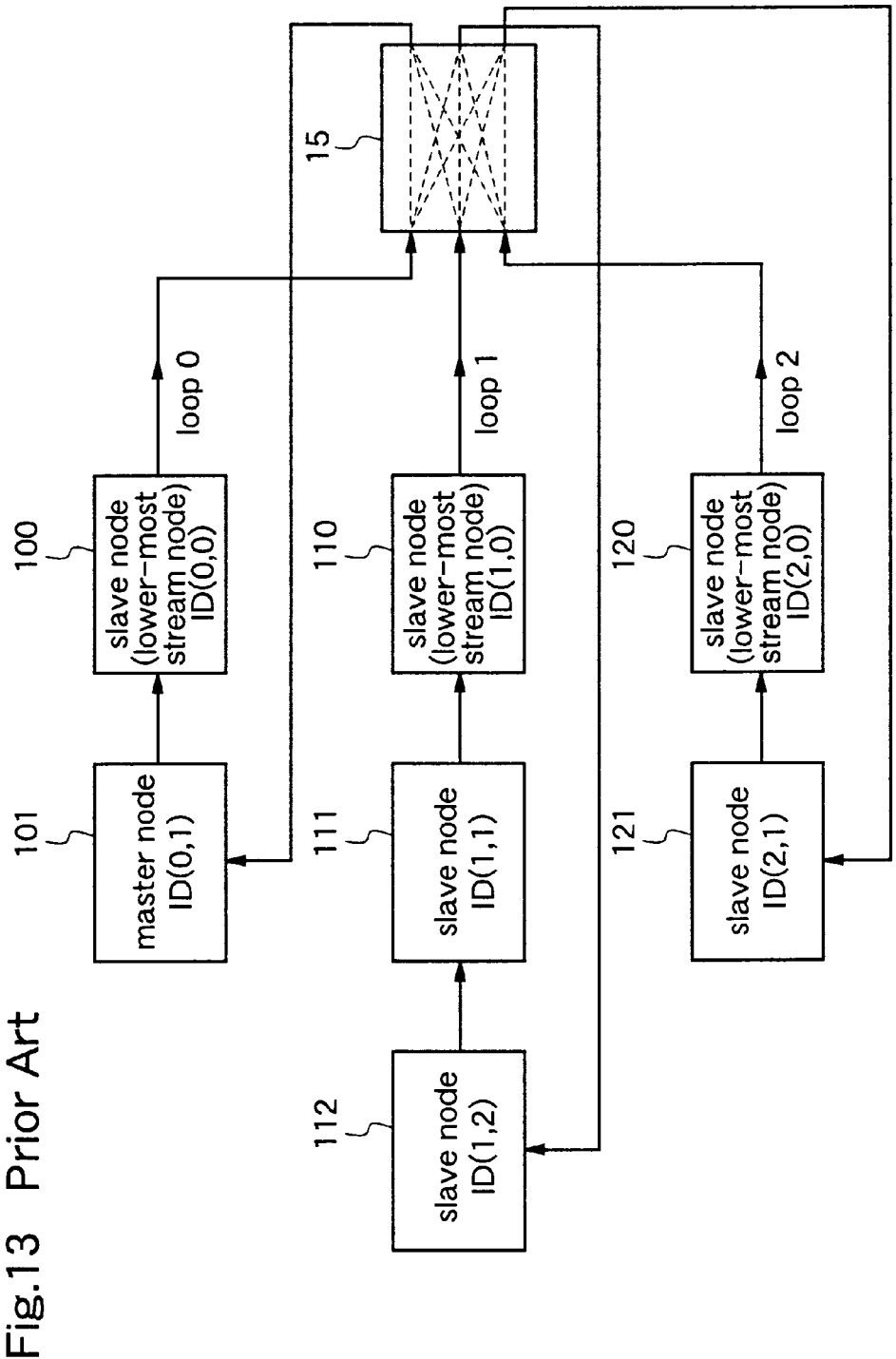
FIG. 13 is a diagram for explaining problems associated with the conventional example.

In the above-described method for specifying the location of the failure, when the failure occurs, every node detects occurrence of the failure, and then detects the location of the failure. For this reason, normal communication cannot be performed until detection of the location of the failure and then recovering from the failure are completed. In a case where data communication which requires isochronism such as transmission of video data, audio data, and the like, is performed in normal communication, communication is interrupted due to occurrence of the failure, which causes lack of video data or audio data, resulting in audio skipping or lack of video. As a solution to this, in order to prevent interference with normal communication if the failure occurs, there may be provided "no-signal time periods" as described below. Turning to FIG. 10, there may be provided "no-signal time periods" when no signals are transmitted on the transmission line in normal data communication. In FIG. 10, reference numeral 10a denotes a time period during which the specific signal pattern is communicated, 10b denotes a time period during which normal data communication is performed, and 10c denotes a "no-signal time period". As shown in FIG. 10, since the "no-signal time period" comes periodically, each of the nodes recognizes timing at which the "no-signal time period" starts and timing at which the "no-signal time period" ends, if it receives no signal. When the specific signal pattern is not received, and thereby occurrence of the failure is detected, the nodes use the "no-signal time period", to transmit/receive various types of signals such as the notification signal, the specifying signal, the ID packet, and the like, thereby specifying the location of failure or performing recovering from the failure. If the respective nodes already know timing of the "no-signal time period", the "no-signal time period" need not be present periodically.

Information of construction of the network at normal operation may be stored to be used when specifying the location of the failure. In a case where nodes are connected at random in a loop, and therefore it is not clear how node IDs of respective nodes are arranged in the loop, specifying the node ID of the node just below the location of the failure is sometimes insufficient. In this case, information of the network at normal operation (order of the node IDs of the connected nodes in the loop) is stored, and from this information and the node ID of the node just below the location of the failure, the location of the failure is specified by deciding where the node just below the location of the failure and the node just above the location of the failure are located in the loop. For example, in the case where the order of the node IDs of the connected nodes in the loop is "ID (1, 1) [ID of upper-most stream node]" and the node ID of the node just below the location of the failure is ID (1, 4), the location of the failure is between the node of ID (1, 0) and node of ID (1, 0) and node of ID (1, 4) or between the second-upper-most node and the third-upper-most node.

In addition to construction of the nodes described above, as shown in FIG. 11, each node 11a may include control means 11j for controlling normal data transmission/receiving, a switch 11h, and a switch 11i. The control means 11j controls data transmission/receiving at normal operation. Placing the switch 11h to "A" makes connection between the control means 11j and the receiving means 11g. Placing the switch 11h to "B" makes connection between control means 11d and the receiving means 11g. Placing the switch 11i to "A" makes connection between the control means 11j and the transmission means 11f. Placing the switch 11i to "B" makes connection between the control means 11d and the transmission means 11f. In the normal state, the switch 11h and the switch 11i are connected to the control means 11j, that is, these switches are placed to "A", for performing normal data communication. When the failure occurs, the switch 11h and the switch 11i are connected to the control means 11d, that is, these switches are placed to "B", for performing transmission/receiving of the signal for detecting the location of the failure. In this case, these switches are controlled by the control means 11d. Upon detecting occurrence of the failure, the control means 11d places the switches from "A" to "B", and before normal data transmission/receiving starts, it places the switches from "B" to "A". With this node construction, the location of the failure can be specified and the alternative master node can be selected.

The node at which the failure has occurred, upon recognition of the failure of itself, may operate in a "bypass mode" in which it passes the received signal without being processed. In a case where the node cannot transmit data of itself or cannot receive data from the other nodes due to the node failure, if it operates in the bypass mode, the other normal nodes which belong to the same loop as the failure node, need not leave the network system. Thus, in case of nodes using the bypass mode, the location of the failure can be specified and the alternative master nodes can be selected in the same manner as described above.

In the method for selecting the alternative master node described in this embodiment, only selection of the alternative master node can be performed. In case of a so-called bus type network in which all nodes are directly connected to a common transmission line (a network constructed by loops each including a single node as an example of the network shown in FIG. 1, is also included in the bus type network), it is decided that the failure occurred at the master node from the fact that the specific signal pattern is not received, and each of the nodes may perform selection operation for the alternative master node as described above. In addition, in case of a single-loop type network, when the failure occurs at the master node, and the master node operate in the "bypass mode", the alternative master node can be selected according to the method for selecting the alternative master node of this embodiment, whereby stop of operation of the whole network system is avoided, and operation is continued.

What is claimed is:

1. A network system in which plural nodes are connected by means of a transmission line, and a specific signal pattern is transmitted to the transmission line at regular time intervals within a fixed time period, wherein each of the plural nodes includes signal monitoring means for detecting existence/non-existence of a signal transmitted on the transmission line and detection means for detecting receiving of the specific signal pattern, the detection means detecting occurrence of a failure in the network system, and wherein each of the nodes which have detected occurrence of the failure, specifies a location of the failure such that a specifying signal is transmitted or received among the nodes, whether or not the specifying signal is received is detected by the signal monitoring means to decide whether or not the failure has occurred at a spot adjacent to itself, and a signal for specifying a decided location of the failure is transmitted or received among the nodes.

2. A network system in which at least one loop comprising plural nodes loop-connected by means of a transmission line and at least one loop comprising either a single node or the plural nodes loop-connected by means of the transmission line are directly connected to a common transmission line having at least one input port and at least one output port in which a signal input through one input port branches and the resulting signals are output from all output ports, a node of the plural nodes included in one of the loops serves as a master node, nodes other than the node serving as the master node serve as slave nodes, nodes present on lower-most streams in respective loops become lower-most stream nodes in the respective loops, and a specific signal pattern is transmitted at regular time intervals within a fixed time period, wherein each node includes signal monitoring means for detecting existence/non-existence of a signal transmitted on the transmission line and outputting a monitor signal, and detection means for detecting receiving of the specific signal pattern and outputting a signal indicating undetection when the specific signal pattern has not been received during more than a fixed time period, and detects occurrence of a failure in the network system according to the signal indicating undetection, each the nodes which have detected occurrence of the failure, notifies an adjacent node of occurrence of the failure by using a notification signal, respective nodes in the network system detect occurrence of the failure according to the notification signal, each of the nodes which have detected occurrence of the failure in the respective loops, transmits a specifying signal to an adjacent node, a node which has detected that it does not receive the specifying signal, according to the monitor signal output from the signal monitoring means, decides that the failure has occurred on an upper stream of itself, and transmits information of a location of the failure in a corresponding loop in the form of an identifier packet including information which identifies itself, to the corresponding lower-most stream node, each of plural lower-most stream nodes decides the location of the failure in a corresponding loop according to the identifier packet and the monitor signal, and transmits information of a decided location of the failure in the corresponding loop in the form of the identification packet such that identifier packets from respective lower-most steam nodes do not collide, and each of the nodes which have detected occurrence of the failure and the nodes which have detected occurrence of the failure according the notification signal, specifies the location of the failure in the network system, according to the monitor signal and the identifier packets.

3. The network system of claim 2, wherein the master node outputs an inquiry packet to each of the lower-most stream nodes at normal operation, each of the lower-stream nodes outputs a response packet upon receiving the inquiry packet directed to itself, and the master node detects occurrence of the failure by detecting that it does not receive the response packet.

4. The network system of claim 2, wherein the notification signal is a signal which interferes with receiving of the specific signal pattern.

5. The network system of claim 1, wherein the specific signal pattern includes a transmission node identifier corresponding to a node identifier of a node which is allowed to transmit data and a receiving node identifier corresponding to a node identifier of a node which is allowed to receive data, and a node obtains a transmission/receiving right according to the specific signal pattern.

6. The network system of claim 2, wherein the specific signal pattern includes a transmission node identifier corresponding to a node identifier of a node which is allowed to transmit data and a receiving node identifier corresponding to a node identifier of a node which is allowed to receive data, and a node obtains a transmission/receiving right according to the specific signal pattern.

7. The network system of claim 1, wherein each node includes control means for controlling transmission and receiving of a signal in detecting occurrence of the failure, normal data transmission and receiving control means for controlling transmission and receiving of a signal in a normal state, and switches which are connected to the normal data transmission and receiving control means in the normal state and are connected to the control means when the failure occurs.

8. The network system of claim 2, wherein
each node includes control means for controlling transmission and receiving of a signal in detecting occurrence of the failure, normal data transmission and receiving control means for controlling transmission and receiving of a signal in a normal state, and switches which are connected to the normal data transmission and receiving control means in the normal state and are connected to the control means when the failure occurs.

9. The network system of claim 1, wherein
there are provided no-signal time periods during which all nodes do not perform normal communication, and
the nodes which have detected occurrence of the failure, transmit or receive signals and packets which are used for detecting occurrence of the failure and specifying the location of the failure and are to be transmitted or received among the nodes, during the no-signal time periods, in order to prevent interference with normal data communication.

10. The network system of claim 2, wherein
there are provided no-signal time periods during which all nodes do not perform normal communication, and
the nodes which have detected occurrence of the failure, transmit or receive signals and packets which are used for detecting occurrence of the failure and specifying the location of the failure and are to be transmitted or received among the nodes, during the no-signal time periods, in order to prevent interference with normal data communication.

11. The network system of claim 1, wherein
each node includes storage means for storing information of construction of the network system at normal operation, and
each of the nodes which have detected occurrence of the failure, specifies the location of the failure in the network system according to the information of construction of the network system stored in the storage means and the decided location of the failure.

12. The network system of claim 2, wherein
each node includes storage means for storing information of construction of the network system at normal operation, and
each of the nodes which have detected occurrence of the failure, specifies the location of the failure in the network system according to the information of construction of the network system stored in the storage means and the decided location of the failure.

13. The network system of claim 1, wherein
the network includes a master node and at least one slave node, each of the master node and slave nodes has a unique node identifier used for identifying itself, and the slave nodes includes at least one candidate node for an alternative master node,
the candidate node which can perform communication normally, when deciding that the alternative master node should be selected according to a specified location of the failure in the network system, starts operation as the alternative master node after waiting time according to the unique node identifier elapses,
the candidate node which can perform communication normally, when detecting return of the master node during the waiting time, returns to operation of the slave node, and thereby the alternative master node is selected from at least one candidate node group, and
priorities are determined according to unique node identifiers and, after time required for transmitting information indicating that a candidate node; of a priority K being integer has started operation as the alternative master node to all nodes elapses, waiting times of a candidate node having a priority lower than the K ends.

14. The network system of claim 2, wherein
the network includes a master node and at least one slave node, each of the master node and slave nodes has a unique node identifier used for identifying itself, and the slave nodes includes at least one candidate node for an alternative master node,
the candidate node which can perform communication normally, when deciding that the alternative master node should be selected according to a specified location of the failure in the network system, starts operation as the alternative master node after waiting time according to the unique node identifier elapses,
the candidate node which can perform communication normally, when detecting return of the master node during the waiting time, returns to operation of the slave node, and thereby the alternative master node is selected from at least one candidate node group, and
priorities are determined according to unique node identifiers and, after time required for transmitting information indicating that a candidate node of a priority K being integer has started operation as the alternative master node to all nodes elapses, waiting times of a candidate node having a priority lower than the K ends.

15. The network system of claim 2, wherein
when a node decides that it cannot perform communication normally according to the specified location of the failure, the node stops operation of communication and leaves the network system.

16. The network system of claim 13, wherein
the waiting time determined according to the unique identifier is a product of a fixed time period "T" and either all or a part of a node identifier.

17. The network system of claim 14, wherein
the waiting time determined according to the unique identifier is a product of a fixed time period "T" and either all or a part of a node identifier.

18. The network system of claim 16, wherein
the fixed time period "T" is twice as much as or more than the maximum value of transmission delay time between nodes.

19. The network system of claim 17, wherein
the fixed time period "T" is twice as much as or more than the maximum value of transmission delay time between nodes.

20. The network system of claim 13, wherein
the candidate node starts operation as the alternative master node by outputting a specific signal pattern, and detects return of the master node by receiving the specific signal pattern.

21. The network system of claim 14, wherein
the candidate node starts operation as the alternative master node by outputting a specific signal pattern, and detects return of the master node by receiving the specific signal pattern.

22. The network system of claim 1, wherein
the network includes a master node and at least one slave node, each of the master node and slave nodes has a unique node identifier for identifying itself, and the slave nodes include at least one candidate node for an alternative master node,
the master node outputs the specific signal pattern, each node knows time at which it will receive the specific signal pattern, each candidate node knows whether or not it has the highest priority of all the nodes, and a candidate node having the highest priority, after detecting occurrence of the failure by detecting that it does not receive the specific signal pattern at time when it will receive the specific signal pattern, operates as the alternative master node, upon recognizing that the alternative master node should be selected.

23. The network system of claim 2, wherein the network includes a master node and at least one slave node, each of the master node and slave nodes has a unique node identifier for identifying itself, and the slave nodes include at least one candidate node for an alternative master node, the master node outputs the specific signal pattern, each node knows time at which it will receive the specific signal pattern, each candidate node knows whether or not it has the highest priority of all the nodes, and a candidate node having the highest priority, after detecting occurrence of the failure by detecting that it does not receive the specific signal pattern at time when it will receive the specific signal pattern, operates as the alternative master node, upon recognizing that the alternative master node should be selected.

24. The network system of claim 22, wherein the candidate node having the highest priority holds communication management information held by the master node.

25. The network system of claim 23, wherein the candidate node having the highest priority holds communication management information held by the master node.

26. A network terminal used in a network system in which plural nodes are connected by means of a transmission line, and a specific signal pattern is transmitted to the transmission line at regular time intervals within a first fixed time period, said terminal comprising:

receiving means which receives a signal transmitted on the transmission line;

signal monitoring means which detects existence/nonexistence of the signal transmitted on the transmission and outputs a monitor signal;

detection means which detects receiving of the specific signal pattern transmitted on the transmission line, and outputs a signal indicating undetection when the specific signal pattern is not received during more than a second fixed time period;

control means which detects occurrence of the failure according to the signal indicating undetection which is output from the detection means, outputs a notification signal and a specifying signal upon detecting occurrence of the failure, outputs an identifier packet when deciding that the failure has occurred on an upper stream of a corresponding node by detecting that the specifying signal is not received, and decides a location of the failure from the monitor signal and a received identifier packet;

transmission means which outputs signals toward the transmission line; and storage means which stores a node identifier for identifying a corresponding node.

27. A method for specifying a location of a failure in a network system in which plural nodes are connected by means of a transmission line, and a specific signal pattern is transmitted to the transmission line at regular time intervals of within a first fixed time period, wherein the nodes detect occurrence of the failure in the network system by detecting that they have not received the specific signal pattern during more than a second fixed time period, each of the nodes which have detected occurrence of the failure, transmits or receives a specifying signal among the nodes, and decides whether or not the failure has occurred at a spot adjacent to itself by detecting that it does not receive the specifying signal, and respective nodes specify the location of the failure in the network system by transmitting or receiving a signal indicating a decided location of the failure.

28. A method for specifying a location of a failure in a network system in which at least one loop comprising plural nodes loop-connected by means of a transmission line and at least one loop comprising either a single node or the plural nodes loop-connected by means of the transmission line are directly connected to a common transmission line having at least one input port and at least one output port, in which a signal input through one input port branches and the resulting signals are output from all output ports, a node included in one of the loops serves as a master node, nodes other than the node serving as the master node serve as slave nodes, nodes present on lower-most streams in respective loops become lower-most stream nodes in the respective loops, and a specific signal pattern is transmitted at regular time intervals within a fixed time period, wherein nodes detect occurrence of the failure in the network system by detecting that they have not received the specific signal pattern during more than a fixed time period, each of the nodes which have detected occurrence of the failure, outputs a notification signal to notify an adjacent node that the failure has occurred, respective nodes in the network system detect occurrence of the failure according to the notification signal, each of the nodes which have detected occurrence of the failure in the respective loops, outputs a specifying signal to an adjacent node, a node decides that the failure has occurred on an upper stream of itself by detecting that it does not receive the specifying signal, and outputs information of the location of the failure in a corresponding loop in the form of an identifier packet including information for identifying itself, to the corresponding lower-most stream node, and each of plural lower-most stream nodes, decides the location of the failure in a corresponding loop, from the identifier packet and the monitor signal, and transmits information of a decided location of the failure in the form of an identifier packet such that identifier packets transmitted from the plural lower-most stream nodes do not collide, and each of the nodes which have detected occurrence of the failure and the nodes which have detected occurrence of the failure according the notification signal, specifies the location of the failure in the network system, according to the monitor signal and the identifier packets.

29. A network system in which a network includes a master node having a unique node identifier and either one or a plurality of slave nodes each having a unique node identifier, and the slave nodes includes at least one candidate node for an alternative master node, said network system being a master-slave network system, wherein the candidate node which can perform communication normally, when detecting a failure at the master node, starts operation as the alternative master node after waiting time according to the unique node identifier elapses, the candidate node which can perform communication normally, when detecting return of the master node during the waiting time, returns to operation of the slave node, and thereby the alternative master node is selected from at least one candidate node group, and priorities are determined according to unique node identifiers and, after time required for transmitting information indicating that a candidate node of a priority K being integer has started operation as the alternative master node to all nodes elapses, waiting times of a candidate node having a priority lower than the K ends.

* * * * *

UNITED STATES PATENT AND TRADEMARK OFFICE
CERTIFICATE OF CORRECTION

PATENT NO. : 6,680,903 B1
DATED : January 20, 2004
INVENTOR(S) : Kenichi Moriguchi et al.

It is certified that error appears in the above-identified patent and that said Letters Patent is hereby corrected as shown below:

Column 24,
Line 3, after "each" insert -- of --;
Line 25, change "steam" to -- stream --.

Column 26,
Line 1, delete the ";" after "node" and after "K" insert -- , K --;
Lines 2 and 25, after "being" insert -- an -- and insert -- , -- after "integer";
Line 24, after "K" insert -- , K --.

Column 30,
Line 6, after "K" insert -- , K --;
Line 7, after "being" insert -- an -- and after "integer" insert -- , -- .

Signed and Sealed this

Twenty-second Day of June, 2004

JON W. DUDAS
*Acting Director of the United States Patent and Trademark Office*